United States Patent
Thielemans et al.

(10) Patent No.: US 6,483,555 B1
(45) Date of Patent: Nov. 19, 2002

(54) UNIVERSAL DEVICE AND USE THEREOF FOR THE AUTOMATIC ADJUSTMENT OF A PROJECTOR

(75) Inventors: Robbie Thielemans, Deerlijk; Claude Tydtgat, Ledegem, both of (BE)

(73) Assignee: Barco N.V., Frankrijklaan Poperinge (BE)

(*) Notice: Subject to any disclaimer, the term of this patent is extended or adjusted under 35 U.S.C. 154(b) by 0 days.

(21) Appl. No.: 09/209,415

(22) Filed: Dec. 11, 1998

Related U.S. Application Data

(63) Continuation-in-part of application No. PCT/BE97/00071, filed on Jun. 12, 1997.

(30) Foreign Application Priority Data

Jun. 12, 1996 (BE) .............................................. 9600536

(51) Int. Cl.[7] .............................. H04N 9/28; H04N 9/31
(52) U.S. Cl. ........................ 348/745; 348/807; 348/744
(58) Field of Search ................................ 348/745, 744, 348/189, 190, 180, 806, 807; H04N 3/22, 9/28, 9/31, 3/26

(56) References Cited

U.S. PATENT DOCUMENTS

| | | |
|---|---|---|
| 5,091,773 A | 2/1992 | Fouche et al. |
| 5,170,258 A | 12/1992 | Micic et al. |
| 5,231,481 A | 7/1993 | Eouzan et al. |
| 5,345,262 A | 9/1994 | Yee et al. |
| 5,432,404 A | 7/1995 | Ogino et al. |
| 5,497,054 A | 3/1996 | Ryu |

FOREIGN PATENT DOCUMENTS

| | | |
|---|---|---|
| EP | 498 659 | 8/1992 |
| EP | 616 473 | 9/1994 |
| WO | 92/08319 | 5/1992 |

OTHER PUBLICATIONS

Patent Abstracts of Japan, Murakami; 03280677, Dec. 11, 1991.
Patent Abstracts of Japan, Unno et al; 03245687, Nov. 1, 1991.

*Primary Examiner*—Sherrie Hsia
(74) *Attorney, Agent, or Firm*—Pillsbury Winthrop LLP

(57) ABSTRACT

A universal device provided with means to be controlled by a control unit which forms part of a projector. The device, in conjunction with this control unit, can be used for the automatic adjustment of the projector. More specifically, the adjustments of convergence, geometry, focus, astigmatism, contrast modulation, gamma correction, soft edge, adjacent and overlapping geometry. In addition, the device provides support for non-adjustment tasks such as signal decoding, signal testing and analysis, peak detection, RAM expansion, wire-free transmission of information between at least two projectors. The universal device exhibits different operational characteristics in accordance with different applications imposed on it by the control unit of the projector. The device includes an analog-to-digital converter, a memory, a programmable digital component, and an interface to the control unit of the projector as some of the components.

31 Claims, 10 Drawing Sheets

UNIVERSAL DEVICE AND USE THEREOF FOR THE AUTOMATIC ADJUSTMENT OF A PROJECTOR

This is a continuation-in-part of International Application PCT/RE 97/00071; filed Jun. 12, 1997.

TECHNICAL FIELD TO WHICH THE INVENTION RELATES

The present invention relates to a universal device, provided with means to be controlled by a control unit which forms art of a projector. The device in conjunction with this control nit can be used inter alia for the automatic adjustment of the projector.

BACKGROUND ART

A standard CRT projector comprises three cathode ray tubes: one red, one green and one blue. Each of these cathode ray tubes is provided with projection means, which direct the light from these cathode ray tubes to a common screen. Three separate pictures are formed in this way, each in a different colour, which are superimposed on the screen. To obtain a good and clear picture on the screen, the different colours must be coordinated with one another. When a red, blue and green line are projected onto the screen, a white line can be seen on the superimposed picture when these three lines impinge exactly on each other, in other words when the convergence is well adjusted.

Many systems have been devised to improve the accuracy of the convergence adjustment.

First of all there is a manual adjustment system, as described for example in U.S. Pat. No. 4,672,275. In this, a reference picture provided with a number of reference points is projected onto the screen. A test picture which looks like the reference picture is projected onto this. This test picture is provided with a number of adjustment points, each corresponding to one of the reference points. In addition, a correction part is provided which corresponds to a given part of the reference picture. The correction part is a partial collection of the adjustment points. On carrying out the convergence adjustment, an adjustment point is selected within the correction part. The position of the selected adjustment point is altered with respect to the corresponding reference point. At the same time and proportionally, the positions of the other points within the correction part are also altered. As a result, the convergence of the correction part is built up in relation to the corresponding part of the reference picture. The correction data are stored in a large RAM.

This manual adjustment is very labour-intensive and time-consuming. Many potentiometers need to be set and moreover these frequently interact. It therefore follows that one requires a high level of knowledge to optimally adjust the equipment.

U.S. Pat. No. 4,999,703 describes a device for automatic convergence adjustment of a projector. Convergence correction is executed automatically, even during the operation of the projector, faults occurring as a result of drift in the electronic and mechanical components of the projector being eliminated. A test pattern for each of the primary colour pictures is projected onto a screen and the light reflected by the screen is scanned by a scanning system. The positions where the light sensor of the scanning system detects the test pattern for each of the primary colours are stored in a memory. These positions are then processed to determine correction values for the convergence of the primary colour pictures, in order to obtain convergence over the whole screen. A disadvantage of this method is that complete pictures are stored in the memory. For this purpose, large, and therefore expensive, memories are required.

U.S. Pat. No. 5,345,262 also describes a method and device for automatic convergence adjustment. In accordance with the method described therein, a test pattern is generated consisting of a row of discrete pattern units each of which has a contour and a central area, a variation in the illumination intensity appearing between the contour and the central area of the pattern unit. The test pattern is projected by each of the cathode ray tubes of the system. A row of light-sensitive elements is arranged so that they pick up the light from the test patterns that has been reflected by the screen. The position of each of the pattern units of a first projected test pattern is compared with the positions of the corresponding pattern units of the other projected test patterns. A number of error signals are generated and these are then used to control the cathode ray tubes so that the position of one of the test patterns is displaced in relation to the other such that the size of the error signals is reduced.

In accordance with a characteristic of the method described in the abovementioned American patent, the positions of different pattern units are compared by determining the centre of the slightly varying illumination intensity of each of the projected test patterns and comparing this with the position of the centres of the illumination intensity of the other test patterns.

A disadvantage of this is that a complete picture is sampled, which requires large memories, so-called frame memories. Frame memories are large memories that are able to store a complete picture. These are expensive and, in addition, time is lost during the adjustment process by looking for those locations where the test patterns have been displaced in relation to each other—thus where the convergence is not well adjusted.

The convergence adjustment takes place in the said patent by calculating central points. This calculation is background-sensitive, and in some cases (for example with a blurred picture) can lead to incorrect results. If the central points are adjusted on top of one another, the eye will not necessarily view this as the correct convergence adjustment.

Another disadvantage of the adjustment method described therein and the corresponding adjustment equipment is that only the convergence can be adjusted. For complete adjustment of a projector, the geometry, focus, astigmatism, contrast modulation and gamma correction must also be adjusted in addition to the convergence. All these adjustments have a mutual influence on each other.

In the method and equipment described in U.S. Pat. No. 5,342,262, the intensity of the background light is measured and stored once only. This has the disadvantage that during the further adjustment process fluctuations in the background light are not taken into account.

In U.S. Pat. No. 5,091,733, U.S. Pat. No. 5,231,481, EP-A-0 616 473, EP-A-0 498 659, U.S. Pat. No. 5,497,054 and U.S. Pat. No. 5,432,404, devices with specific applications are described for automatic adjustments of projectors. All these named publications are based on test pattern generators being specifically present, which ensure the generation of a pre-defined pattern unit or units. The associated adjustment methods are based on the presence of the generated test pattern and its shape (for example discrete light points etc.).

These said publications all deal with devices with specific applications which execute only a limited number of adjustments automatically, demands frequently being made on the hardware used and on the underlying hardware which ensures actual controlling. There are thus publications which are based on the fact that a filter is included for the camera used, and that there is no connection between different control zones and different adjustments per se, that the hardware is synchronized with the analog signal coming from the camera, and that the measurement results are absolute, etc. Other publications make demands on the camera used: the resolution of the camera must be sufficiently high, in some cases the camera must be set up so that it is itself movable, and/or the complete picture must be sampled, requiring the presence of large memories.

Not one of the abovementioned publications provides suitable solutions for obtaining rapid adjustments using a universal device in a broad range of projectors, irrespective of the control hardware itself. Besides, the devices described in the aforementioned patents (applications) are not able to fulfil any tasks other than the adjustments of the projectors. They cannot serve as a peak detector, as a signal decoder, as a RAM expansion, for signal testing and analysis, or for wire-free transfer of information, without anything needing to be altered on the device.

It is an object of the invention to solve the aforementioned disadvantages relating to the convergence control using a universal device, and also to automate other adjustments, without sacrificing the universal character of the device according to the invention.

It is likewise an object of the invention to apply relevant automatic adjustments to projectors which are not of the CRT type, without in so doing changing the described methods.

DISCLOSURE OF THE INVENTION

The universal device, in accordance with the present invention, has the advantage that the same device can provide different adjustments for a projector, in accordance with the command signals sent by the control unit of the projector to the device.

The same device can also be used for other applications, possibly even outside the projector applications.

A universal device, in accordance with the invention, is provided with means intended to be controlled by a control unit which forms part of a projector. The device exhibits different operational characteristics in accordance with different applications imposed on it by the control unit. The device comprises the following components:

an analog-to-digital converter, a memory, a programmable digital component and an interface to the control unit of the projector.

The device is universal. This means that the device is not responsible for just one task but, for each task where it is used, it is put into another operating state or mode by the control unit.

The universal device may also have an application imposed via an external control unit, for example via the control unit of a PC. This external control unit then sends its command signal or its command signals to the control unit which forms part of the projector, serves as a gate, and transmits the command signal or command signals to the universal device.

The projector, the control unit of which controls the universal device, may be a CRT projector, an LCD projector or any similar light valve projector.

Preferably, the analog-to-digital converter of the universal device is an 8-bit converter.

The memory is a high-speed RAM in each case. According to a preferred embodiment, the memory is a small memory. The expression small memory is to be understood as a small memory in terms of the prior art. With the progression of technology, ever larger memories are being manufactured. Therefore, it is possible that what is now regarded as a small memory will in a few years no longer be on the market and that what is now described as an average or even large memory will, within a few years, form part of what is now regarded as a small memory.

In contrast to the methods and equipment known from the prior art for the automatic adjustment of projectors, in every case for the present invention it is not necessary to have a memory sufficiently large to store the information of a complete picture. A typical value for the memory used in the universal device is, for example at this time, 32K, where a frame memory has a size of the order of 256K.

Using this small memory has the advantage that the universal device according to the invention, whenever use is made of the automatic adjustment system for a projector, is cheaper than the adjustment devices which are known from the prior art without accuracy and efficiency being lost.

According to yet another preferred embodiment, the universal device has a plug with a pin to which an analog signal can be applied. The signal is ultimately responsible for the analog-to-digital converter. This plug can be a separate plug, to which, for example, an analog signal originating from a camera can be applied. However, it can also form part of the interface to the control unit of the projector.

Again, according to another preferred embodiment, there are no means to ensure hardware synchronization with the analog signal applied to the pin. This means in fact that, for example, a PLL is superfluous which again makes the universal device cheaper. The presence of a PLL is not required when the data are sampled at a much higher frequency than the analog signal bandwidth.

The aforementioned universal device can be used for adjusting one or more of the following controls to a picture projected onto a screen by a projector: convergence, geometry, focus, astigmatism, contrast modulation and gamma correction.

Adjustment of the convergence means that the different colours which are projected onto the screen are aligned with each other.

When adjusting the geometry it can be investigated, inter alia, whether or not the projected straight lines exhibit a degree of curvature ('bow' or 'pin') and whether or not lines which should be horizontal or vertical on the screen have a degree of slope ('skew' or 'key').

When focusing it is ensured that the image of a pixel projected on the screen is sufficiently sharp, for example in a CRT projector it is ensured that the electron beam correctly impinges on the faceplate (=the screen of the picture tube).

Astigmatism is the phenomenon which occurs, inter alia, on account of the fact that the electron beam in a picture tube does not intersect the faceplate orthogonally. As a result, the virtual pixel (or spot) that is thus formed is deformed elliptically. This elliptical deviation should be removed for optimal projection performance (sharpness).

In contrast-modulation adjustment, the intensity of each of the three projected colours is controlled separately in the same manner, to compensate for losses caused by light loss resulting from projection distance and lens effects. In this way a flat intensity curve is obtained ideally which means that there is as much light in the middle as the edges.

Gamma correction has to be carried out because colour is dependent on different control factors, including a non-linear relationship between the light and the incoming signal.

The universal device in accordance with the invention can also be used to adjust soft edge and adjacent and/or over-lapping geometry (edge matching) in pictures being projected onto a screen using a minimum of two projectors (this is in addition to the adjustment of the aforementioned controls that can be carried out independently on each of the projectors).

Soft edge must be adjusted when a picture that is built up on the screen via one of the projectors exhibits an overlapping zone with a picture which is projected onto the screen by one of the other projectors. Soft edge adjustment is the adjustment of the intensity of both the pictures in this overlapping zone. In this process, the intensity of one picture in the overlapping zone must be slowly decreased while the intensity of the other picture in the overlapping zone must be slowly increased.

Adjustment of the adjacent geometry is the adjustment of the geometry of pictures which are projected adjacent to each other by two projectors (perhaps with a small overlapping zone in which soft edge is adjusted).

Overlapping geometry adjustment is the adjustment of the geometry of pictures projected on top of one another via two projectors.

The aforementioned adjustments can be carried out on one or more CRT projectors, LCD projectors or light valve projectors.

The universal device can also be used for other applications, for example for video digitization, as a peak detector, as RAM expansion, as co-processor for the control unit, as test configuration, for light communication between a minimum of two projectors and for signal decoding, for example for teletext decoding.

Another aspect of the present invention is a projection system which is provided with the aforementioned universal device. The projection system has a screen, a projector and a camera. The projector is provided with at least one picture-forming means that generates a picture, at least one projection means in order to project that picture onto the screen and a control unit. The camera is linked to the projector and views the picture or pictures which is/are projected onto the screen. This supplies an analog signal that is applied to the pin of the universal device. The control unit of the projector establishes the said device in a set mode after which it is able to execute tasks sent by the control unit and on the command of the control unit.

In order to carry out the adjustment methods described below, the colours of the projector must be switchable. Sometimes adjustment is only carried out on one of the colours at a time and sometimes a plurality of colours is needed at the same time.

According to a preferred embodiment of the invention, the camera, which is linked to the projector in the projection system, is a low-resolution camera. If the associated adjustment software is powerful enough, the price of the hardware can thus be reduced.

The camera may be a monochrome or a colour camera.

In accordance with another preferred embodiment, the camera is connected immovably to the projector.

It is not necessary for the camera to view the whole picture projected onto the screen, as long as it can view the locations where the effect of an adjustment to be carried out is visible.

The invention also provides methods for the automatic adjustment of all the aforementioned controls which can be carried out on the pictures which have been built up on a screen using at least one projector.

A first method which can be implemented using the universal device is one for the automatic adjustment of the convergence of at least two pictures, each of which has covered a different light path and which are built up on a screen using a projector. This projector is provided with a control unit and hardware responsible for convergence control. A camera linked to the projector views the pictures projected onto the screen and transmits a signal corresponding to the viewed picture to the control unit. According to the method, the pictures projected onto the screen are split into one or more adjustment zones. These adjustment zones do not necessarily have to be a matrix layout—they may overlap. In the remaining part of the present document, the term 'zone' is the location where a particular control has the most effect. The coordinates of the adjustment zone or zones, as viewed by the camera on the screen, are fetched. This fetching operation for the coordinates may consist either of measuring the coordinates on the screen or, once they have been measured and written to a memory, of reading in the coordinates from the said memory or of the said coordinates being input by a user. The pictures that are projected onto the screen are viewed using the camera and form an analog signal which is converted into digitized values via an analog-to-digital conversion. The geometry of the projected pictures is not important as long as for each of the pictures to be adjusted the picture information more or less corresponds and is useful. The picture information, for example, can be for one picture the letter 'I' and for the other picture the letter 'T'. The picture information is then useful (the vertical lines of both letters can be adjusted on top of each other), and it more or less matches (both letters are not the same, but nevertheless have a part that corresponds: the vertical line). Even the intensity of both pictures does not have to be the same, as long as both pictures are visible. Using the digitized values a mathematical model can be constructed. Preferably, the mathematical model reproduces the effect of the convergence control in a specific adjustment zone on all other zones linked to this zone if the picture to be adjusted has been split into more than one zone. The relative distance between the pictures to be adjusted relative to one another in the adjustment zone or zones is determined by correlation of the digitized values.

Control signals are derived from the relative distance thus obtained and are sent to the hardware, which is responsible for the adjustment of the convergence in the adjustment zone or zones.

Another possibility for the application of this method is that the mathematical model, as calculated using the digitized values, can be written to a non-volatile memory. In a subsequent automatic convergence adjustment, this model written to memory is used as a starting point. The new measured digitized values are entered into the model, and if necessary the model is adapted on the basis of these.

The mathematical model, the mathematical model for the convergence adjustment as well as the mathematical models which will be disclosed below, can also calculate and model the chromatic aberration of the lens—the so-called 'prism' effect.

The method given below is provided for the automatic adjustment of the geometry of a picture which is built up on a screen using a projector. For this, the projector is provided with a control unit and hardware responsible for the adjustment of the geometry. A camera linked to the projector views the screen. The picture which has been projected onto the screen is split into one or more adjustment zones. These zones do not have to be in the form of a matrix, they may overlap each other. Reference values for the geometry are fetched (measured, read in from a memory or input by a user). The camera views the projected picture and generates an analog signal that is converted into digitized values via an analog-to-digital conversion. The geometry of the projected picture is not important as long as the picture information is useful and more or less corresponds to the reference values. The term 'more or less corresponds to' has the same meaning as in the case of convergence. A mathematical model is constructed using the digitized values. This mathematical model preferably reproduces the effect of one adjustment zone on all the other zones linked to this adjustment zone if the projected picture was split into more than one adjustment zone. The relative distance between the reference values and the picture, which is to be adjusted to the reference values, in the adjustment zone or zones is determined by correlation. From this relative distance, signals are derived which are sent to the hardware responsible for the geometry control concerning the adjustment zone or zones.

Likewise, the model as calculated using the digitized values may be written to a non-volatile memory. When a subsequent automatic adjustment is made to the geometry, this model written to memory is used as a starting point. The newly measured digitized values are entered into the model and if necessary the model is adapted on the basis of these.

The method given below is provided for the automatic adjustment of adjacent and/or overlapping geometry of pictures which are built up on a screen using at least two projectors. For this, the projectors are each provided with a control unit and hardware responsible for the control of adjacent and/or overlapping geometry. One or more cameras linked to the projectors view the screen. The pictures which have been projected onto the screen are split into one or more adjustment zones. These zones do not have to be in the form of a matrix, and can overlap each other. In addition, the projected pictures do not have to be test patterns as understood in the prior art: any picture can be used on the condition that the picture information is useful and more or less corresponds. The coordinates of the adjustment zone or zones, as viewed on the screen by the camera, are fetched (measured, input by the user or read in from a memory). The projected pictures are viewed using the camera or cameras and form an analog signal that is converted into digitized values via an analog-to-digital conversion. A mathematical model is constructed using these digitized values. Preferably this mathematical model reproduces the effect of an adjustment zone on all the other zones that are linked to this adjustment zone if the pictures have been split into more than one adjustment zone. Correlation is used to determine the relative distance between the pictures undergoing adjustment in the adjustment zone or zones. Signals are derived from this relative distance which are sent to the hardware responsible for the control of adjacent and/or overlapping geometry concerning the adjustment zone or zones.

Here too, as has been described above, the model can be written to a non-volatile memory where it is stored for later use for the automatic adjustment of adjacent and/or overlapping geometry.

A method for the automatic adjustment of the focus of a picture, built up on a screen using a projector, the projector being provided with a control unit and hardware responsible for focus control and a camera, linked to the projector, being used to view the screen, is provided, comprising the following steps. Firstly, the picture, projected onto the screen, is split into one or more adjustment zones. These adjustment zones need not necessarily be in the form of a matrix and may overlap each other. As adjustment of focus takes places on only one colour at a time, the picture information only has to be useful so that the methods described below give sufficient information. The coordinates of the adjustment zone or zones, as viewed on the screen by the camera, are fetched (measured, read in from a memory or input by a user). The camera views the picture projected on the screen and this forms an analog signal that is converted into digitized values via an analog-to-digital conversion. The digitized values are used in the construction of a mathematical model. Preferably, the mathematical model reproduces the effect of focus control in a specific adjustment zone on all the other zones linked to this zone if the picture to be adjusted has been split into more than one zone. The relative values for the optimum focus value of the adjustment zone or zones are determined and signals are derived from these relative values for the optimum focus value, which signals are sent to the hardware responsible for the focus control concerning the adjustment zone or zones.

According to a preferred embodiment of the method for the automatic adjustment of the focus, the relative value for the optimum focus value is determined by calculating the variance on the basis of histograms.

According to another preferred embodiment of this method, the relative value for the optimum focus value is determined by spectrum evaluation.

By using spectrum evaluation a choice may be made between different forms of optimum sharpness observed by the user. It is for this reason that optimum focus value is referred to.

Thus one may want a pixel that has little 'flair', that is the pixel has little low light intensity at the edges or it may be, for example, wide in the low light intensities and narrow in the high light intensities.

In this case as well, the model can be written to a non-volatile memory. On a subsequent focus control, the parameters of the model are fetched so that the model does not have to be constructed again on the basis of digitized values.

The following method is provided for the automatic adjustment of astigmatism of a picture which is built up on a screen using a projector. For this, the projector is provided with a control unit and hardware responsible for the control of astigmatism. A camera linked to the projector views the screen. The picture projected onto the screen is split into one or more adjustment zones, which need not be in matrix form and which may overlap. The coordinates of the adjustment zone or zones, as viewed on the screen by the camera, are fetched (measured, read in from a memory or input by a user). As adjustment of astigmatism takes place on only one colour at a time, the picture information only has to be useful so that the method described below gives sufficient information. The projected picture is viewed by the camera, and this forms an analog signal which is converted into digitized values via an analog-to-digital conversion. These digitized values are used to construct a mathematical model which preferably reproduces the effect of the astigmatism control in a specific adjustment zone on all other zones linked to this zone if the picture has been split into more than one zone. The relative measures for the astigmatism are determined from the digitized values and from these relative measures signals are derived which are sent to the hardware responsible for astigmatism control concerning the adjustment zone or zones.

According to a preferred embodiment, the relative measures for the astigmatism are determined by calculating the variance on the basis of histograms.

According to another preferred embodiment, spectrum evaluation is used to determine the relative measures for the astigmatism.

According to yet another preferred embodiment, the relative measures for the astigmatism are determined using moment evaluation.

As described previously, the model can also in this case be written to a non-volatile memory for later use.

The method, which according to the invention is provided for the automatic adjustment of the contrast modulation of a picture which is built up on a screen using a projector, consists of the following steps. The projector itself has a control unit and hardware responsible for the control of contrast modulation. A camera linked to the projector views the screen. Calibration values for the colour of the picture are fetched for the camera. The picture projected onto the screen is split into one or more adjustment zones, which do not necessarily have to be in matrix form and may overlap each other. The coordinates of the adjustment zone or zones as viewed by the camera on the screen are fetched (measured, read in from memory or input by a user). As the adjustment of contrast modulation takes places for only one colour at a time, the picture information only has to be useful. Useful information is pictures which possess slowly varying intensity variations (slow with reference to the measurement rate) so that, using the method described later in this document, sufficient information can be extracted for intensity adjustment, for example a uniform picture. The projected picture is viewed by the camera, and forms an analog signal which is converted into digitized values via analog-to-digital conversion. The digitized values are used to construct a mathematical model. Preferably this reproduces the effect of the contrast-modulation control in a specific adjustment zone on all other zones linked to this zone if the picture has been split into more than one adjustment zone. A measurement for the relative intensity is determined and from this signals are derived which are sent to the hardware responsible for the contrast-modulation adjustment concerning adjustment zone or zones.

The model can be written to a non-volatile memory for later use where it may be fetched for a subsequent contrast-modulation control.

A method for the automatic gamma-correction adjustment of a picture which has been built up on a screen using a projector also forms part of the present invention. The aforementioned projector is provided with a control unit and hardware responsible for gamma-correction control. A camera linked to the projector views the screen. The method consists of the following steps. Firstly, calibration values for the camera are fetched for the colour of the said picture. The picture projected onto the screen is split into one or more adjustment zones which need not be in matrix form and may overlap one another. The coordinates of the adjustment zones, as viewed by the camera on the screen, are fetched (measured, read in from a memory or input by a user). As gamma-correction adjustment takes place only on one colour at a time, the picture information only has to be useful. Useful information is pictures which possess slowly varying intensity variations (slow with reference to the sampling rate), so that, by using the method described later in this document, sufficient information can be stored for gamma-correction adjustment, for example a uniform picture. The camera views the picture projected onto the screen and this forms an analog signal, which is converted into digitized values via analog-to-digital conversion. The digitized values are used to construct a mathematical model. If the picture to be adjusted has been split into more than one zone, this mathematical model preferably reproduces the effect of a specific adjustment zone in all the other zones linked to it. A measure of the relative intensity is determined and from this signals are derived which are sent to the hardware responsible for gamma-correction concerning the adjustment zone or zones.

Instead of constructing a model on the basis of digitized values, it can also be fetched from a memory on the condition that it has been written thereto during a previous gamma-correction control.

The following method is provided for the automatic adjustment of soft edge, for pictures which are built up on one or more screens using at least two projectors, each provided with a control unit and hardware responsible for soft edge control, one or more cameras linked to the projectors viewing the screen or screens. Calibration values for the colour of the pictures are fetched for the camera or cameras. The pictures projected onto the screen or screens are split into one or more adjustment zones, which need not be in matrix form and which can overlap each other. The coordinates of the adjustment zone or zones, as viewed by the camera on the screen, are fetched (measured, read in from a memory or input by the user). As adjustment of soft edge occurs only on one colour at a time, the picture information only has to be useful. Useful information is pictures which possess an intensity variation which varies slowly in terms of time (slow is with reference to the sampling rate) so that, using the method described later in this document, sufficient information can be stored for soft-edge adjustment, for example a uniform picture. The pictures projected onto the screen or screens are viewed using at least one camera and these form an analog signal which is converted into digitized values via analog-to-digital conversion. The digitized values are used to construct a mathematical model. If the picture to be adjusted has been split into more than one zone, this mathematical model preferably reproduces the effect of a specific adjustment zone on all other zones which are linked to this zone. A relative intensity measure is determined and from this signals are derived which are sent to the hardware responsible for soft-edge adjustment concerning the adjustment zone or zones.

In this case as well, the model constructed using the digitized values may be written to a non-volatile memory and can be fetched for a subsequent soft-edge adjustment.

In accordance with a preferred embodiment, in each of the abovementioned methods digitized values are added to the digitized values measured. This can occur by interpolation in the time domain or in a frequency domain and also by filtering in the frequency domain. The addition of digitized values introduces an updated, longer series of digitized values.

According to another preferred embodiment, a transformation is carried out on the digitized values. Transformation means both a transformation from the time domain to another domain as well as the inverse transformation from the other domain to the time domain. According to a preferred embodiment, the transformation is a Fourier transform, that is to say a transformation to the frequency domain.

Preferably all the aforementioned methods use linked zones, the said mathematical model each time reproducing the effect of the control corresponding to the method in a specific adjustment zone on all other zones linked to this adjustment zone since adjacent zones exert an effect on each other. Thus if a specific zone were to be adjusted, the previously adjusted zone would no longer be correctly adjusted due to electrical, optical and mechanical effects. In the case of linked zones, two or more zones are adjusted at the same time, as a result of which the mutual effect can be taken into account by the construction of a mathematical model. This has the result that all types of projectors can be adjusted by the aforementioned device. In other words: there are no assumptions made concerning the underlying hardware responsible for the adjustment purpose itself.

The mathematical model can likewise be used to simulate the effects of the different adjustments on one another, for example the effect of correct focus on convergence, or for example the effect of focus on colour equality (contrast modulation) and chromaticity (gamma).

In accordance with another preferred embodiment, the mathematical model used in the aforementioned methods is improved through an iterative process.

Likewise, in accordance with a preferred embodiment, the calculated model is written to a non-volatile memory for each linked zone. This has the advantage that on subsequent adjustment of this model it can be used as a starting point, instead of having to construct the model on the basis of new digitized values.

When adjustments are to be carried out which are different from those disclosed above, preferably an intelligent sequence of the adjustments is retained given their mutual effect on each other.

The present invention also provides a method for wire-free transmission of information between two or more projectors, at least one of the projectors being provided with at least one camera, and the projectors being mounted in front of a screen. In accordance with the invention, the information is picture information, which is projected via one projector onto the screen and viewed by the camera linked to the other projector. The picture viewed by this camera forms an analog signal which is converted into digitized values via analog-to-digital conversion. Command signals are derived from this which are interpreted by the control unit of the projector linked to the camera in question. The control unit responsible for the interpretation of the command signals is also included in the implementation of the method.

The present invention also provides a method for the decoding of information present in a video signal, using a universal device equipped with a pin as described above. In this method, an analog video signal containing information is applied to the pin. This analog video signal is converted into digitized values via analog-to-digital conversion, from which values command signals are derived which are interpreted by the accompanying control unit. The information in the video signal can, for example, be teletext information.

Preferably, the digitized values in each of the aforementioned methods originate from a universal device in accordance with the invention.

BRIEF DESCRIPTION OF THE FIGURES

The invention will be described in further detail with reference to the drawings, in which.

MODES FOR CARRYING OUT THE INVENTION

Figure 17:
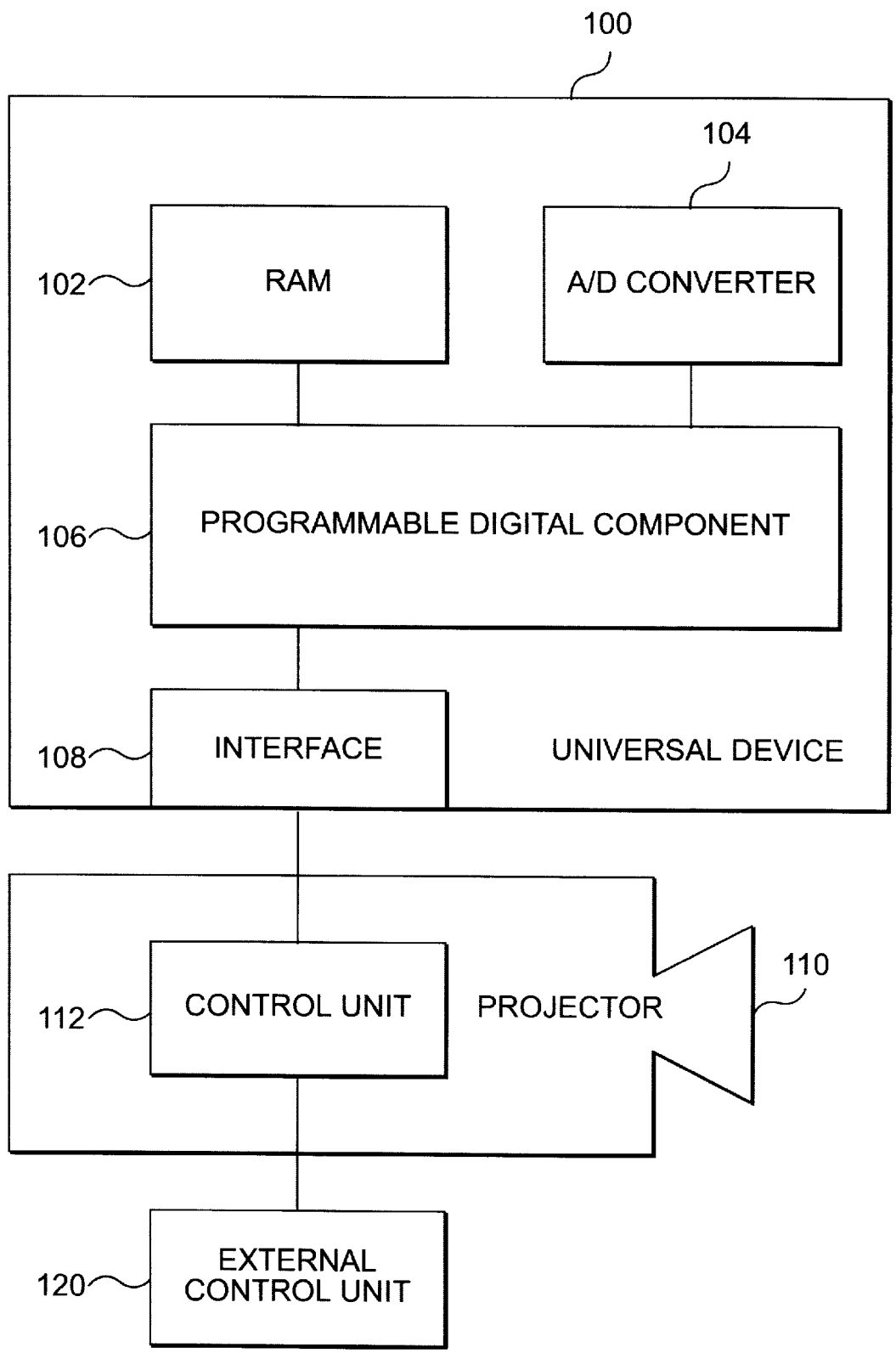
FIG. 17 is a block diagram showing a configuration of an embodiment of the invention.

FIG. 17 shows the basic block diagram of the embodiment of the invention. A universal device (100) provides the basis for adjusting projectors. Also, the universal device provides adequate support for non-adjustment tasks. The adjustment and non-adjustments are imposed on the universal device (100) by a control unit (112) of a projector (110). The universal device (100) exhibits different operational characteristics in accordance with different applications established by the control unit (112). The universal device has an analog-to-digital converter (104), a memory (102), a programmable digital component (106), and an interface to the control unit (112) of the projector (110). The analog-to-digital converter (104) is preferably, but not limited to, an 8-bit converter. Likewise, the memory (102) is a high speed RAM type memory. The size of the memory (102) is generally considered small relative to the state of the art of memory devices (for example 32 K). The external control unit (120) includes the driving input signal of the projector (110). For example, the external control unit (120) may be a camera (6, FIG. 1), for example.

Figure 1:
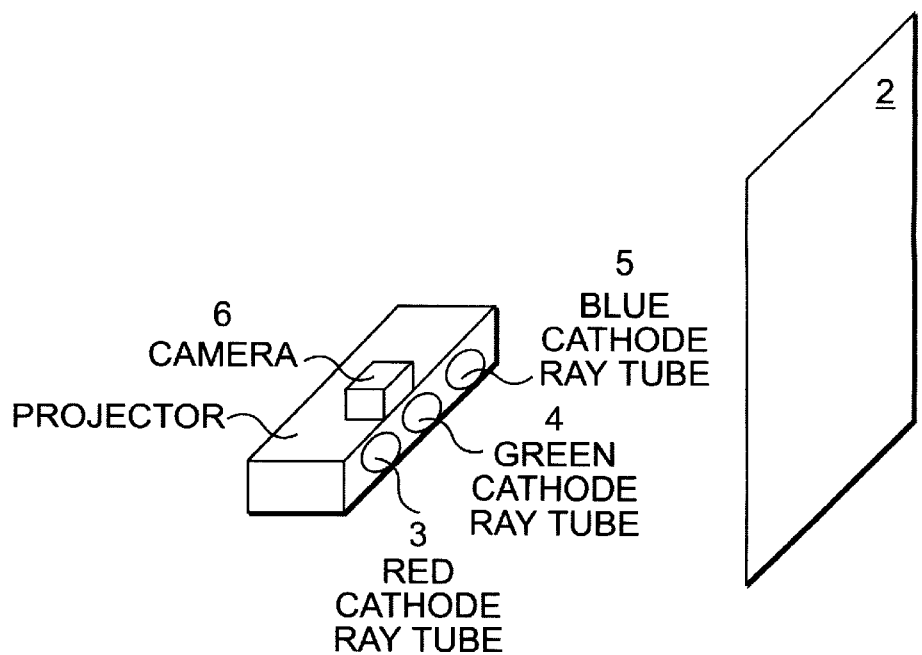
FIG. 1 shows the layout of a projection system, comprising a CRT projector with a built-in camera and a screen.

FIG. 1 shows the layout of a CRT projector (1) in relation to a screen (2). The projector (1) has three cathode ray tubes, a red (3), a green (4) and a blue (5) tube, each of which projects a picture in the corresponding colour onto the screen (2).

Closely related to the projector (1) a camera is present, for example, a CCD (Charge Coupled Device) camera (6) that views the picture projected onto the screen (2).

A mechanical and an electrical pre-adjustment have already been carried out at the manufacturing stage of the projector (1).

At the same time as the mechanical adjustment, the red cathode ray tube (3) and the blue cathode ray tube (5) are mechanically set so that the global convergence is already as good as possible, in other words so that the red, green and blue pictures on the screen (2) coincide as accurately as possible. The green cathode ray tube (4) is used as reference in this process since it normally delivers the most light and because it is the most central of the three cathode ray tubes (3,4,5). The position of this green cathode ray tube (4) cannot be adjusted mechanically in most cases.

Mechanical pre-adjustment is followed by an electrical pre-adjustment, where one uses potentiometers to displace the red and the blue pictures on the screen (2) in the vertical and horizontal directions (these are referred to as vertical and horizontal raster shifts respectively). With this, the convergence in the middle of the screen (2) has already been perfectly adjusted. This is termed the 'static convergence'.

The projector (1) is delivered to the end-user adjusted in this way.

To make optimal use of the projector (1), however, the convergence, geometry, focus, astigmatism and contrast modulation should also be adjusted.

All these adjustments can be carried out using the device according to the present invention which uses the methods described below.

However, before beginning any automatic adjustment whatsoever of a projector (1), a number of settings have to be checked.

Firstly, the camera (6) has to be able to view each zone to be adjusted which are projected onto the screen (2). Preferably, the camera (6) is centred with respect to both the horizontal and the vertical. This is a mechanical adjustment, which only has to be carried out once for each projector (1).

Known technology is used to focus the lens of the camera (6).

Figure 2:
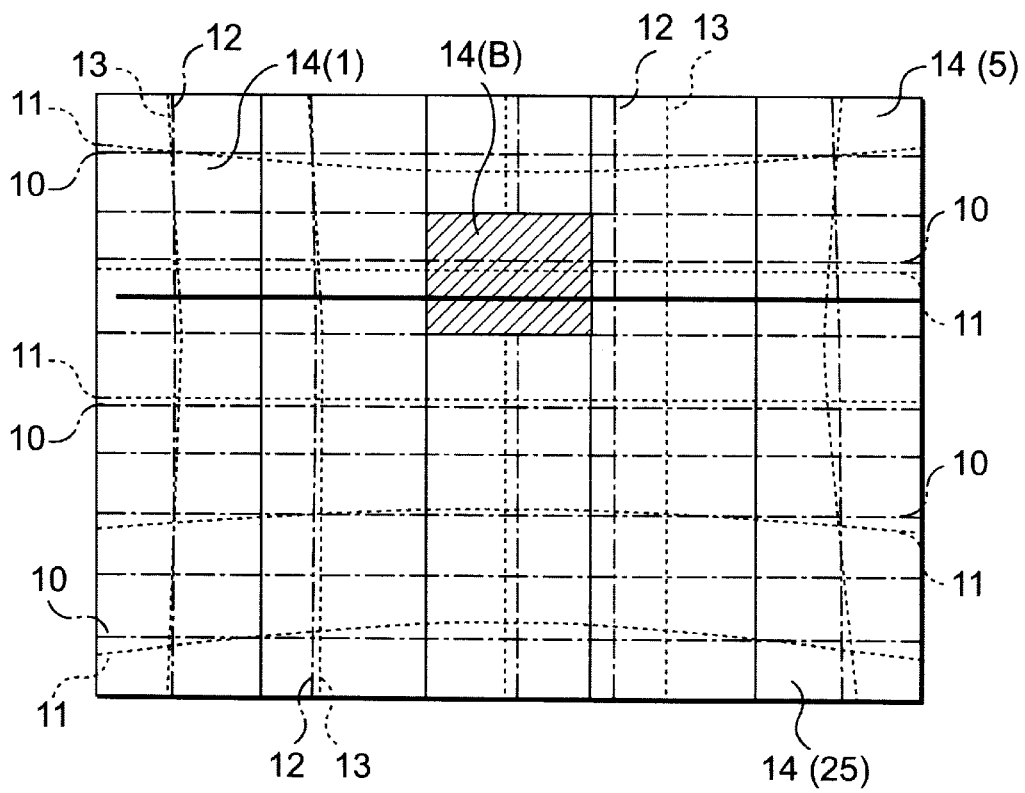
FIG. 2 shows a screen, divided into 25 (=5×5) zones, onto which two pictures are projected.

Then, depending on the need for the automatic adjustment, a green, a blue and/or a red picture are projected onto the screen (2). Each picture may, for example, comprise different horizontal and vertical lines, for example five horizontal lines (10,11) and five vertical lines (12,13), as represented in FIG. 2. If the universal device for the automatic adjustment of a projector (1) is used, the geometry of the picture has no relevance: it may be a line test pattern, but it works equally well with, for example, a piece of text. The sole condition is that the picture information corresponds and is useful for each colour to be adjusted. If test patterns are in fact used, the latter vary both in time and space: thicker contours on the edge (space) to compensate for the light loss, thinner contours (time) whenever very fine tuning is required. To keep the description simple in what follows, a picture built up of horizontal and vertical lines is considered.

The picture projected onto the screen (2) is divided into, for example, 25 zones 14(i) (where i runs from 1 to 25) (5 vertical×5 horizontal), a part of the projected picture falling into each zone 14(i). In the case of the example under consideration, a part of a horizontal line (10,11) of the projected picture and a part of a vertical line (12,13) of the projected picture falls into each zone 14(i).

There are two adjustments per zone 14(i): an adjustment which imparts a vertical shift to the horizontal lines (10,11) of the projected pictures in the zone 14(i) in question, and an adjustment which imparts a horizontal shift to the vertical lines (12,13) of the projected pictures in the zone 14(i) in question. The total number of adjustments to be carried out is approximately 100 in the case described: 25 horizontal and 25 vertical per colour (red and blue have to be adjusted onto green).

The locations of the 25 zones 14(i) that must be adjusted are measured using the camera (6). The geometrical correspondence between a specific zone 14(i) on the screen (2) and the spot on the camera (6) CCD matrix is stored in a memory. This will later make it possible to digitize only around the useful part of the screen (2), the so-called window 14 (8).

The adjustment rate of a projector (1) is determined by the sequence of adjustment. To keep the rate sufficiently high, red and blue are adjusted alternately. In this way, the measurement of a blue line can take place while the convergence of a red line is calculated.

The selection of the algorithms and the manner of their execution also determine the adjustment rate.

1. Automatic Convergence Adjustment of a Projector

To adjust the convergence of two pictures, which are projected onto a screen (2) using a projector (1), the user instructs the projector (1) to carry out the convergence adjustment. The control unit of the projector (1) will set the universal device, which is connected to the projector (1), to a mode which is suitable for carrying out the convergence adjustment. In concrete terms, this means that the universal device is set to 'window digitization mode', so that it is ready, on a command signal from the control unit of the projector (1), to read in and digitize the picture which the camera (6) sees on the screen (2), and to store only the digitization values of the window 14 (8) indicated by the control unit in the memory.

During the adjustment (not only the convergence adjustment, but also the adjustments and other applications discussed later on) it is always possible for the universal device to be set temporarily to another mode, namely an auxiliary mode or secondary mode. Where a specific mode is referred to below, this always means the principal mode necessary for the adjustment or the other application. Controlled switching to secondary modes also determines the adjustment rate and/or the rate of execution of the other applications.

To determine how great a convergence error is (in other words how far apart a green vertical line (12) and the corresponding red vertical line (13), for example, of two projected pictures are situated) in a specific window 14(8), the background light is first measured in the respective window 14(8). To do this, the camera (6) is used to scan in the illumination of the screen (2) onto which no picture has been projected.

The analog signal thus obtained is provided to the universal device of the invention, which device is connected to the control unit of the projector (1) via the interface. This signal is digitized in the analog-to-digital converter and the digitized values belonging to the signal in the window 14(8) to be adjusted are stored. Only the required data are stored in the RAM. The other data which the control unit of the projector (1) does not need at the instant when the window 14(8) under consideration is being adjusted but which the camera (6) still reads in, are not stored. In this way, the control unit, during the further adjustment, will lose no time in searching for the required data from all the digitized values of the complete picture.

The intensity of the background light is measured in this way. Later, when the projected pictures are measured, the intensity of the background light from these measurements may be subtracted in order thus to cut out the effect of the background light. Under normal circumstances (not or spatially slowly varying back lighting for example), this is not necessary.

Figure 3:
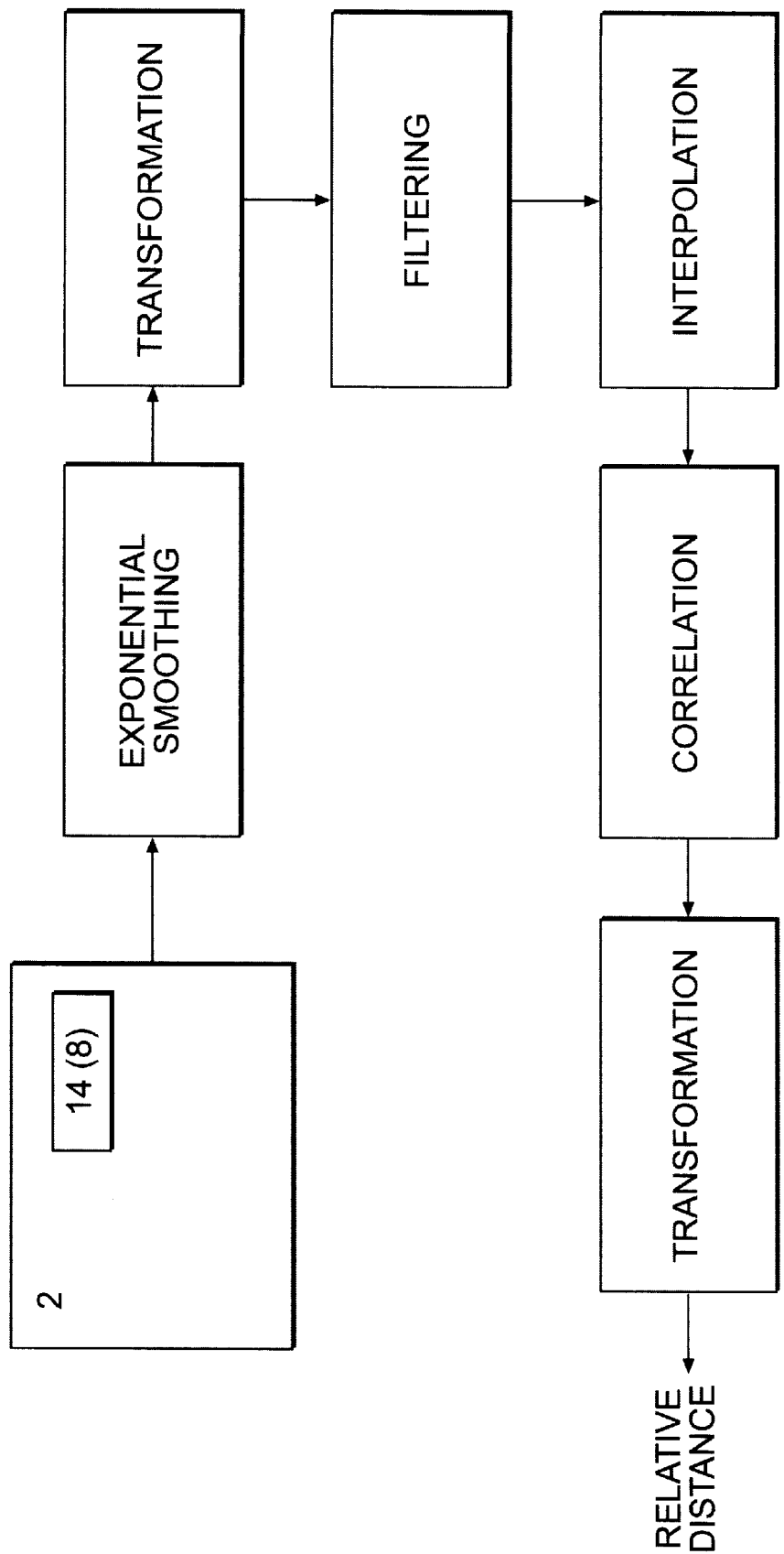
FIG. 3 shows an overview of the sequential steps to be implemented in the measurement and adjustment process to adjust the convergence of a projector.

To take out a convergence error, we implement the steps shown in the block diagram in FIG. 3. These steps will be described in more detail below.

In order to measure a convergence error in the window 14(8) under consideration, the green picture comprising the horizontal lines (10) and the vertical lines (12) is built up on the screen after the background light has been measured. In the case of a horizontal convergence adjustment, a vertical line (12) is measured and in the case of a vertical convergence adjustment, a horizontal line (10) is measured.

The green picture is read in by the camera (6) and forms an analog signal that is provided to the universal device. This signal is digitized in the analog-to-digital converter. Thus digitized values are generated. Only those digitized values coming from the window 14(8) to be adjusted are stored in the memory.

Subsequently, for example, the red picture comprising horizontal lines (11) and vertical lines (13) is built up on the screen (2) and read in by the camera. The analog signal thus formed is once again provided to the universal device. The analog-to-digital converter of the latter digitizes the values for the window 14(8) to be adjusted. These digitized values are also stored in the memory.

In order to determine the magnitude of the convergence error, we must start from these two measured functions, one for green, one for red, and determine how far they have shifted with respect to each other. We must therefore find out, in fact, how much the red line (13) must be shifted so that the red and the green pictures match each other as much as possible.

Correlation

Correlation is a mathematical method to find out when two functions are best matched to one another. In mathematical terms, correlation is always a measure of how well two waveforms match. A characteristic of correlation is that it is very noise-resistant, since noise does not correlate and therefore will not distort the calculations. As an additional consequence the measurements and/or results require little filtering and/or averaging. This has a positive effect on the rate and quality of the adjustment.

Let us consider a measured function g(x) for the green vertical line (12).

Let us consider a measured function r(x) for the red vertical line (13).

If we shift the red vertical line (13) with respect to the green vertical line (12) until the correlation is a maximum, we can thus calculate the location of the maximum from the following function:

$$C(\tau) = \int_0^x r(x) \cdot g(x+\tau) dx \quad (1)$$

The integration from 0 to x is an integration carried out over the measured digitization interval.

The function $C(\tau)$ has a maximum for a specific value of $\tau$. When the maximum of $C(\tau)$ occurs at $\tau=0$, this means that we do not have to shift the functions r(x) and g(x) relative to each other and that the convergence is well adjusted.

Figure 4:
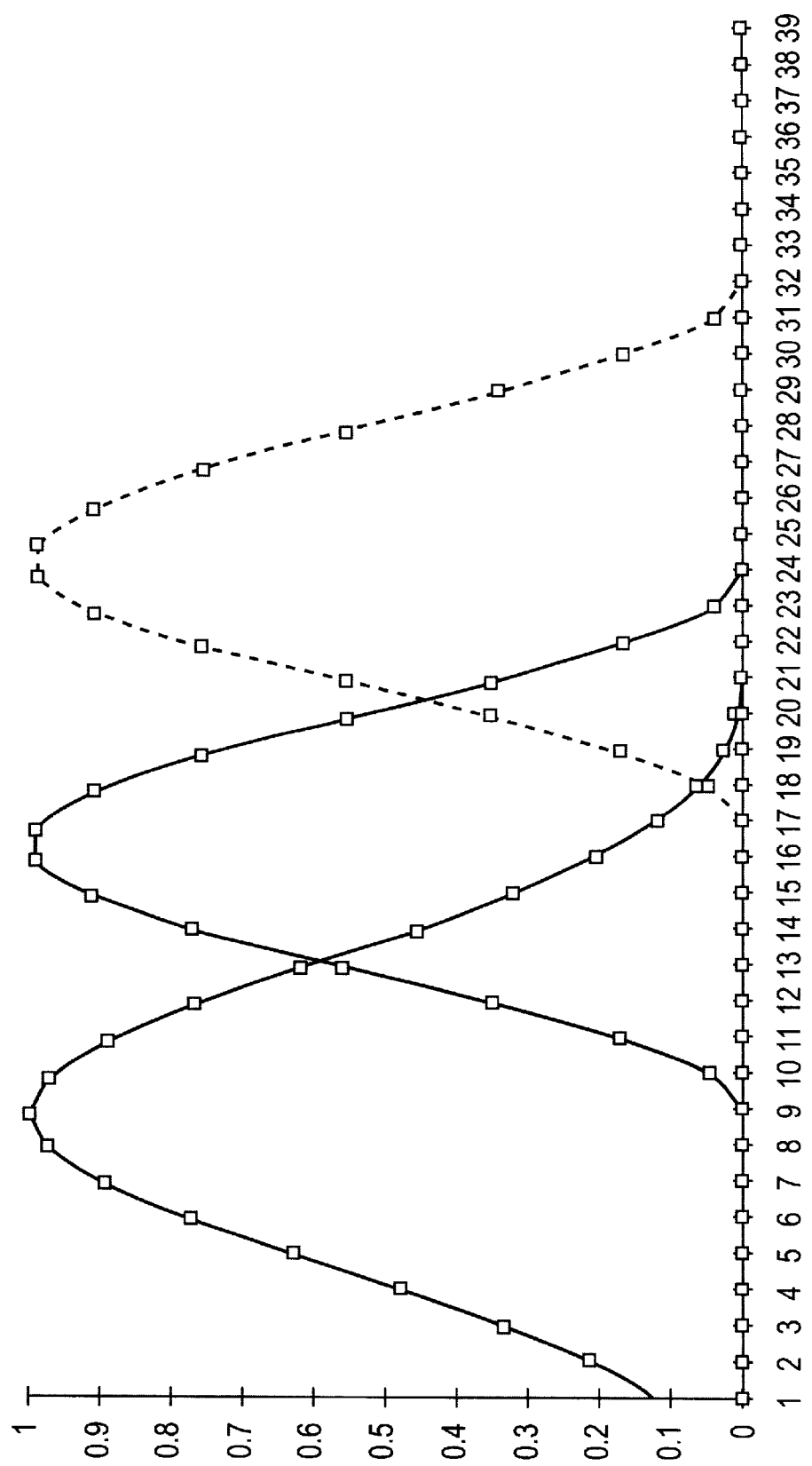
FIG. 4 illustrates the correlation of two similar, time-shifted signals.

The correlation is explained visually in FIG. 4. The two input signals r(x) and g(x) are represented in the figure by a thin continuous line and a dashed line respectively. The normalized correlation function is represented in the figure by a thick continuous line. Both functions r(x) and g(x) are shifted 9 time units with respect to each other. This leads to a maximum in the correlation function at 9, as can be calculated easily using the discrete form of formula (1):

$$C(n) = \sum_{k=-\infty}^{+\infty} r(k)g(n+k)$$

Since the series of numbers have a finite length N, we make use of a circular correlation by connecting g twice in succession, so that g has an imaginary length 2N. The discrete formula is then:

$$C(n) = \sum_{k=0}^{N} r(k)g(n+k)$$

This correlation requires $N^2$ calculations in the time domain.

The location of the maximum of $C(\tau)$ provides a measurement for the convergence error. This $\tau$ has the value zero when convergence is perfect. It is positive when the deviation is in a specific sense and is negative when the deviation is in the opposite sense. From hereon, this convergence error is referred to as the index.

The correlation calculation can also be carried out in two dimensions, so that the convergence error is measured both in the horizontal and the vertical direction at the same time.

In principle, whenever the index in one zone 14(i) is known, we know how much the red vertical line (13) must be shifted with respect to the green vertical line (12) in that zone. We also know the sense. We can thus determine the amount of shift to be applied in each zone 14(i).

However, each zone 14(i) has its own adjustment and these adjustments can be quite different from zone to zone. So, for example, for zone 14(j) we find an adjustment $B_0$, for zone 14(j+1) an adjustment $B_1$, and so forth. Here, $B_0$ is a value between 0 and 127 (if a 7-bit convergence adjustment system is being used), which causes a shift to the line to be adjusted in zone 14(j). $B_1$ is a value between 0 and 127, which causes a shift to the line to be adjusted in zone 14(j+1). $I_0$ (=index 0) is the measured convergence error in zone 14(j), $I_1$ (=index 1) is the measured convergence error in zone 14(j+1). However, the adjustment of $B_0$ also causes a convergence error in zone 14(j+1) and vice versa. This is the effect of the zones on one another. This effect will be eliminated by working with linked zones.

One can write that the index $I_0$ is a function of the adjustments $B_0$ and $B_1$. The same can be said for the index $I_1$. If we assume that the relationship is a linear function, the following is true for $I_0$ and $I_1$:

$$I_0 = a.B_0 + b.B_1 + c$$

$$I_1 = d.B_0 + e.B_1 + f$$

When we plot $I_0$ as a function of $B_0$ and $B_1$ we obtain a plane. The same applies to $I_1$. The best values for the adjustments $B_0$ and $B_1$ are those where $I_0=0$ and $I_1=0$. This amounts to solving the following set of equations:

$$0 = a.B_0 + b.B_1 + c$$

$$0 = d.B_0 + e.B_1 + f \quad (2)$$

The solution to the above provides the two correct values for the adjustments in zone 14(j) and 14(j+1).

The accuracy of this calculation method naturally depends on the determination of the parameters a, b, c, d, e and f.

These first have to be measured. The parameters a, b and c define a plane. They can thus be determined by initially measuring three points. For this purpose, the index $I_0$ is measured for three different pairs $(B_0,B_1)$. This provides a mathematical model for the convergence error in zone 0 as a function of the adjustment in zone 14(*j*) and in zone 14(*j*+1).

The accuracy of this model is determined by the accuracy of the measurements for determining the plane. If there is one deviating measurement amongst these, the complete model remains usable per se. It is precisely those measurements which do not lie within the expected pattern which steer the model in the right direction.

After solving the set of equations (2) we find the "correct" values $B_{0g}$ and $B_{1g}$. These values are used to carry out the adjustment in the zones 14(*j*) and 14(*j*+1) in question, whereupon it is checked whether the values $I_{0g}$ and $I_{1g}$ thus obtained for these values are then effectively zero. If $I_{0g}$ and $I_{1g}$ deviate too far from zero (a permissible deviation is employed), then the planes for $I_0$ and $I_1$ are determined again, making use of this additional measurement. It is not possible to define any plane by means of four points, but it is possible to define the best plane through four points. The best plane through four points is determined by the least squares method. In this way, the model is improved step by step in an iterative process.

The iteration is repeated a maximum of three times. If at that stage a suitable solution has not been found, then the best combination to date of $B_0$ and $B_1$ is used, that is to say the combination which provides the smallest values for $I_0$ and $I_1$. In this way, a step by step approach leads to the ideal values for the adjustments via the mathematical model of two linked zones.

Through a simple expansion of the preceding formulae, the linkage can be extended to a plurality of zones. The horizontal and vertical linkage can occur together.

Signals are derived from the value obtained for the correlation, which gives the relative distance between the two pictures which are to converge with one another, which signals are sent to the hardware which is responsible for the convergence adjustment and which shifts one of the signals towards the other.

In this way, the convergence of the picture (in addition to static convergence which has already been adjusted at the manufacturing stage) is adjusted by the user him-/herself.

Transformations

To limit the time period necessary for the calculation of the correlation $C(\tau)$, the respective Fourier transforms of $r(x)$ and $g(x)$, $R(\omega)$ and $G(\omega)$, are determined.

In the frequency domain, correlation of two signals corresponds to a simple multiplication:

$$v_1(t) \circ v_2(t) \leftrightarrows V_1^*(\omega)V_2(\omega)$$

$$v_1^*(t)v_2(t) \leftrightarrows V_1^*(\omega) \circ V_2(\omega)$$

where ○ stands for correlation and * for the complex conjugate of the corresponding data series.

Consequently, when we have the converted series of sampled data to hand, correlation is calculated using only N multiplication operations (because the numbers are complex). However, the Fourier-converted values must be calculated for both sequences, as well as the inverse-converted value from the correlated sequence. This also requires calculation time.

The Discrete Fourier Transform (DFT) is one of the most important tools in modern applications in digital signal processing. The DFT of a sequence x(n) with a length N is defined as:

$$X(k) = \sum_{n=0}^{N-1} x(n)e^{-j(2\pi/N)} \quad k = 0, 1, \ldots, N-1$$

The computational requirements of a DFT rise quickly as the variable N of the stage increases and thus this has an effect on the performance of the system in real time (the order of the computational time is proportional to $N^2$). This problem has led to the development of particularly fast algorithms, for example the Fast Fourier Transform (FFT). With the FFT, the computational rate is proportional to $N\log_2(N)$.

The definition of the FFT is identical to that of the DFT—only the computational method differs. To attain efficient operation of an FFT, it is important that N is a large number. Typically, the length N of an FFT is a power of two: $N=2^M$. The complete computational algorithm can be split up into a repeated application of an elementary transformation known as 'butterfly' (Cooley-Tukey) form. Examples of FFT may be found in the literature.

Although most FFT algorithms have been developed to calculate the DFT of a complex sequence, in many applications the sequence to be converted is real, as for example in the case where measurements are taken from an analog-to-digital converter. By making use of this characteristic it is possible to obtain an increase in the rate. The formula (3) gives:

$$X(k) = \sum_{n=0}^{N-1} x(n)[\cos(2\pi/N)nk - j\sin(2\pi/N)nk]$$

This formula permits one to analyse the real and imaginary part of X(k) and the following can be stated: in so far as x(n) is real, the real part of X(k) is an even function of k and the imaginary part is odd. Consequently, the computational time is halved.

Even for FFTs, the rate can be increased further without using a special co-processor. The Fourier cosine and sine values, for example, can be retreived from a look-up table so that they do not have to be recalculated each time.

All the aforementioned multiplications are floating point calculations. If special precautions and a particular scaling are used, they can be reduced to a 16-bit integer multiplication. This means another gain in computational speed.

In order to calculate the magnitude of the distance (index) in an alternative quick way, we can just as well use other transforms, such as the Discrete Hartley Transform, the Discrete cosine Transform (DCT), the Karhunen Transform, the Walsh Transform, the Hough Transform or the Hadamard Transform. The Discrete Cosine Transform uses only real numbers (computational time!) and may be obtained directly from an FFT algorithm. A typical characteristic of this DCT is that it is a particular distance variant (an FFT is not). Consequently, this algorithm is particularly applicable as a fast algorithm for convergence adjustment.

An other way to improve calculation speed resides in calculating the transformations in two dimensions. This directly yields two magnitudes of distances (one index for each dimension).

When we determine the transform for each of the obtained sequences of digitized values, calculate the correlation function using these digitized values and calculate the corresponding inverse transform from the result obtained, we find $C(\tau)$.

Filtering

To obtain more consistent results, the measured data are optionally filtered.

This can be done in the time domain by making use of spatial filter techniques, median filters, digital finite response filters or even well-conditioned infinite response filters. The following formulae give a number of ideas as to how the filtering can be implemented.

Take x(n) and y(n) as input and output samples, respectively, at the moment n.

EXAMPLE 1

Spatial Filtering (for Example, 'Neighbourhood Averaging')

An example of a possible spatial filter is:

$$y(n)=Ax(n-2)+Bx(n-1)+Cx(n)+Dx(n+1)+Ex(n+2)$$

This filter describes a kind of averaging of the incoming pixels. This averaging cannot be done in real time, as use is made of future samples. This means that all the input data must first be read in and then the calculation can be carried out.

The aforementioned example shows a calculation in one dimension. However, the filtering can also occur in two dimensions.

EXAMPLE 2

Infinite Response Filter

Figure 5:
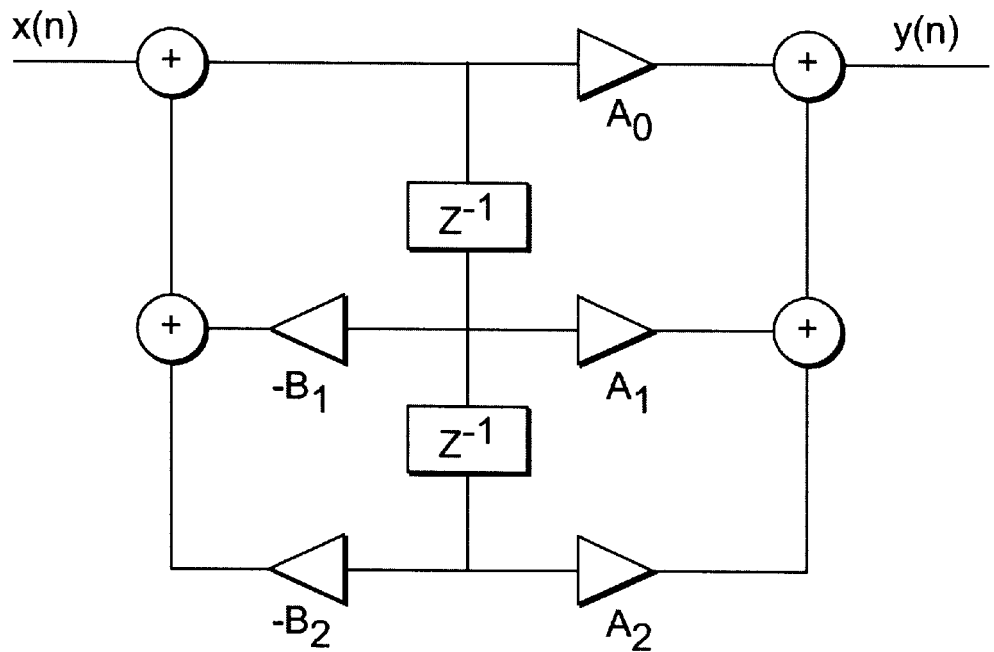
FIG. 5 is a schematic representation of a block diagram of a second-order filter stage.

An example of a possible infinite response filter in the time domain (see FIG. 5) has the transfer function (given in the z-domain):

$$H(z) = \frac{A_0 + A_1 z^{-1} + A_2 z^{-2}}{1 + B_1 z^{-1} + B_2 z^{-2}}$$

From this we obtain the following equations:

$$m(k)=x(k)-B_1 m(k-1)-B_2 m(k-2)$$

$$y(k)=A_0 m(k)+A_1 m(k-1)+A_2 m(k-2)$$

We can define $T_1$ and $T_2$ as follows:

$$T_1=-B_1 m(k-1)-B_2 m(k-2)$$

$$T_2=A_1 m(k-1)+A_2 m(k-2)$$

As $T_1$ and $T_2$ are only dependent on signal values at the times k−1 and k−2 (and not on signal values at time k), we can already calculate these values in the time interval between k−1 and k and store them. When x(k) becomes available at time k, we can quickly calculate y(k) and m(k) by making use of:

$$m(k)=x(k)+T_1$$

$$y(k)=A_0 m(k)+T_2$$

This filter technique can be applied in real time, but demands a great deal of calculation time, particularly when a higher order filter is used (cascading of different filter sections of a lower order). Special provisions must be made to avoid overflow during the calculating—thus a special scaling must be implemented.

EXAMPLE 3

SINC Convolution

The SINC convolution of the original signal in the time domain provides very good performance in terms of quality. The disadvantage is that SINC convolution demands a great deal of computational time. These computations cannot be done in real time.

Figure 6:
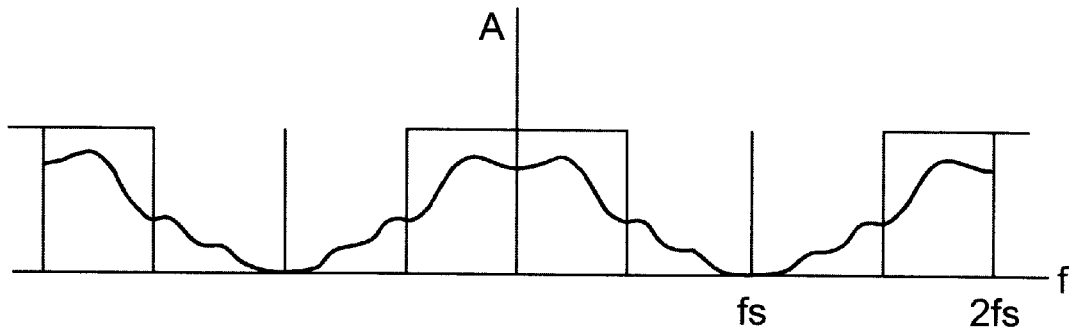
FIG. 6 shows the spectra of non-filtered data and data that have been filtered through a low-pass filter.
Figure 6:
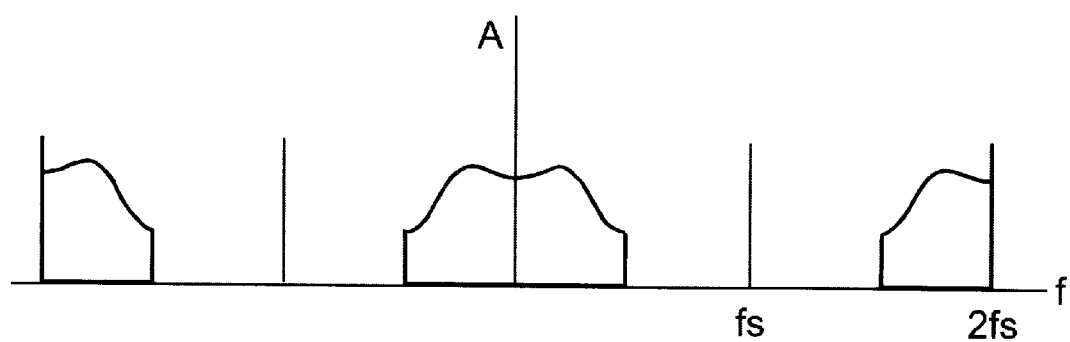

An alternative is to filter in the frequency domain, which is much easier to do than in the time domain. In this application, the objective of a filter is, after all, to eliminate high-frequency, unwanted frequency components. When the Fourier transform of the input data is calculated, as shown in the block diagram in FIG. 3, only the unwanted frequencies have to be annulled. This is shown in FIG. 6 where the amplitude spectrum is given as a function of the frequency. In the figure, 'fs' stands for the Shannon-Nyquist frequency. FIG. 6a shows an unfiltered spectrum, as well as a low-pass filter. FIG. 6b shows the resulting spectrum after passing through the said low-pass filter.

The removal of unwanted frequencies in the frequency domain only requires the Fourier-converted data to be annulled. This provides a new sequence of digitized values.

In turn, the annulment speeds up the calculation of the inverse Fourier transform.

Interpolation

Figure 7:
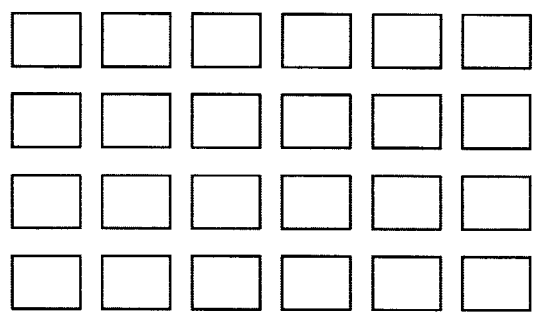
FIG. 7 is an abstract representation of a CCD matrix.
Figure 8A:
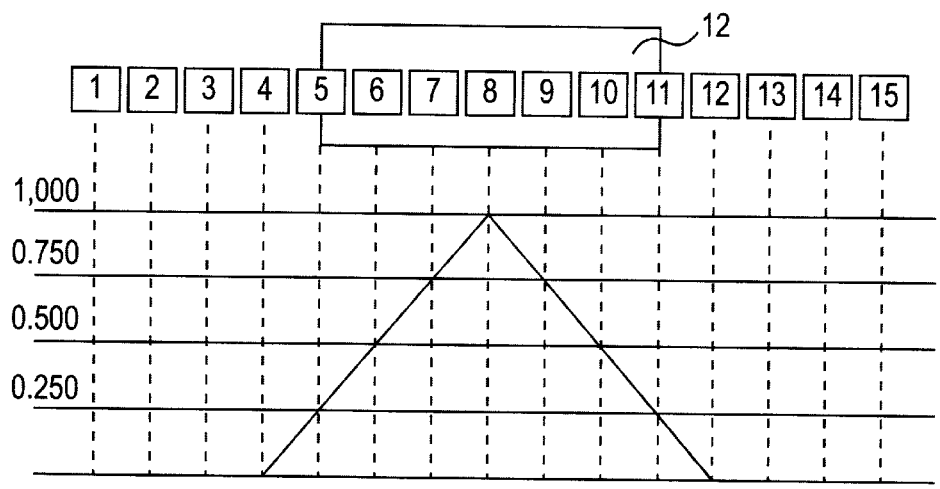
FIG. 8 depicts a horizontal line of pixels from a camera, which is illuminated by a vertical line with constant light intensity.
Figure 8B:
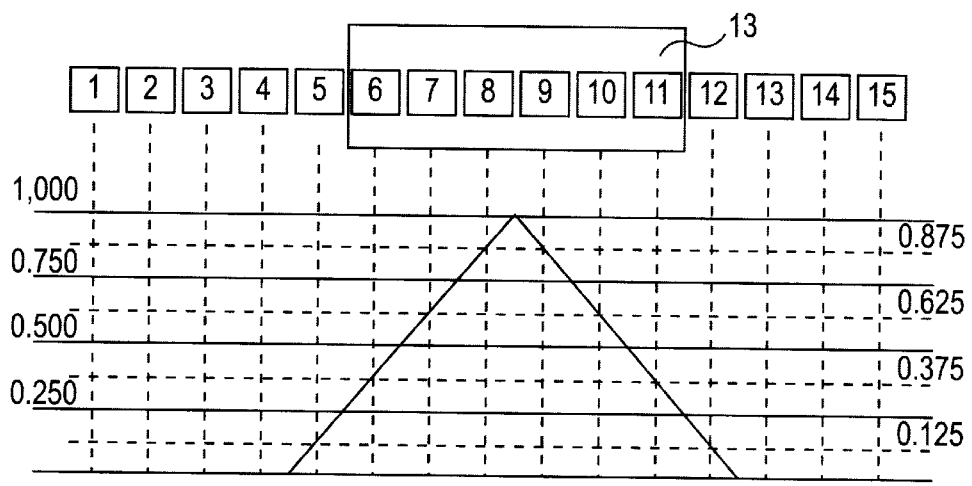
Figure 8C:
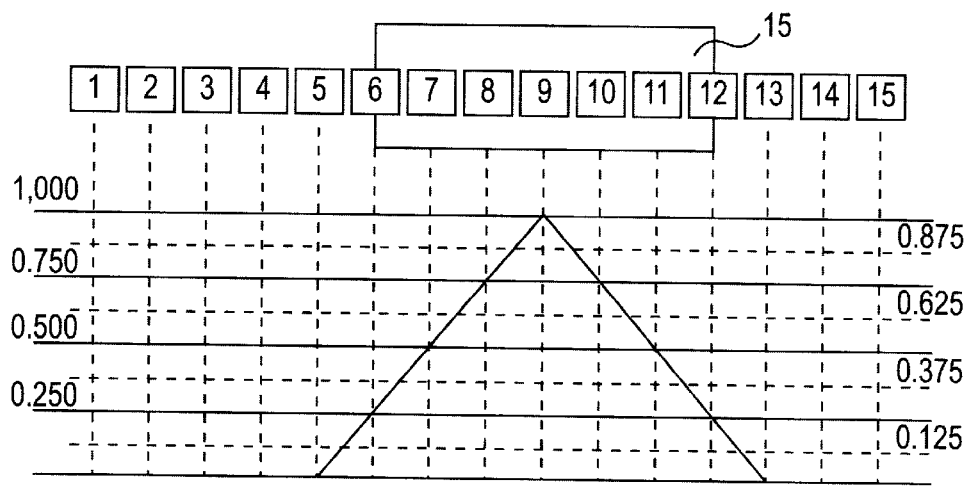

Consider the camera (6) CCD matrix as shown in FIG. 7. This consists of $N_x$ horixontal and $N_y$ vertical pixels. To keep matters simple, we will only examine. one horizontal line of pixels illuminated by a vertical line of constant light intensity (FIG. 8). In FIG. 8a, the horizontal row of pixels is illuminated by a vertical green reference line (12); in FIG. 8b, the row of pixels is illuminated by a vertical red line (13) and in FIG. 8c, it is illuminated by a vertical blue line (15).

As the light intensity is constant (the different light intensities are adjusted so that this is the case), the area is described by the analog signal that appears at the output of the CCD camera (6) and is also constant in value. At first glance, the precise position of the vertical line (13) in FIG. 8b, with reference to the CCD pixels, cannot be effectively determined. In the figure, in fact, we can see that the maximum falls between the pixels (8) and (9). In any case, the innermost pixels (6 to 11) contribute to the waveform.

In the case of FIG. 8c, one can conclude that the line is precisely positioned on pixel (9) of the CCD line.

The digitized values of the data from FIG. 8a, FIG. 8b and FIG. 8c are shown in Table 1:

TABLE 1

| Pixel number | Green reference line 12 | Red line 13 | Blue line 15 |
|---|---|---|---|
| 1 | 0.000 | 0.000 | 0.000 |
| 2 | 0.000 | 0.000 | 0.000 |
| 3 | 0.000 | 0.000 | 0.000 |
| 4 | 0.000 | 0.000 | 0.000 |
| 5 | 0.250 | 0.125 | 0.000 |
| 6 | 0.500 | 0.375 | 0.250 |
| 7 | 0.750 | 0.625 | 0.500 |
| 8 | 1.000 | 0.875 | 0.750 |
| 9 | 0.750 | 0.875 | 1.000 |
| 10 | 0.500 | 0.625 | 0.250 |
| 11 | 0.250 | 0.375 | 0.500 |
| 12 | 0.000 | 0.125 | 0.250 |
| 13 | 0.000 | 0.000 | 0.000 |
| 14 | 0.000 | 0.000 | 0.000 |
| 15 | 0.000 | 0.000 | 0.000 |

Correlation on the non-interpolated arrays provides no conclusive answer for anyone wanting to measure the distance between the red line (13) and the green line (12) as the computation is associated with noise and limited accuracy of the CCD camera (6). The circular correlation values (where a single measurement is, as it were, placed a number of times in succession, so that when multiplying, once all the measured values of the signal have been used up, multiplication is carried out not by 0 but by starting again with the value at the beginning of the signal) can be found in Table 2 (the green line (12) is the reference for the correlation).

TABLE 2

| Distance (in pixels) | Correlation green-red | Correlation green-blue |
| --- | --- | --- |
| 0 | 2.625 | 2.500 |
| 1 | 2.625 | 2.750 |
| 2 | 2.219 | 2.500 |
| 3 | 1.594 | 1.938 |
| 4 | 0.938 | 1.250 |
| 5 | 0.438 | 0.625 |
| 6 | 0.156 | 0.250 |
| 7 | 0.031 | 0.063 |
| 8 | 0.000 | 0.000 |
| 9 | 0.031 | 0.000 |
| 10 | 0.156 | 0.063 |
| 11 | 0.438 | 0.250 |
| 12 | 0.938 | 0.625 |
| 13 | 1.531 | 1.250 |
| 14 | 2.031 | 1.938 |

Hence we may conclude that the correlation maximum for green-red lies at distance 0 or 1 (there are two maxima in the table) and the correlation maximum for green-blue lies at a distance of 1. No real conclusion with regard to the green-red correlation con therefore be drawn.

To obtain higher accuracy, the original values, for example, are interpolated once. Table 3 shows a possible row of interpolated values based on the values from Table 1.

TABLE 3

| Green | Red | Blue |
| --- | --- | --- |
| 0.000 | 5.250 | 4.922 |
| 0.000 | 5.375 | 5.250 |
| 0.000 | 5.250 | 5.375 |
| 0.000 | 4.922 | 5.250 |
| 0.000 | 4.433 | 4.922 |
| 0.000 | 3.844 | 4.438 |
| 0.000 | 3.188 | 3.844 |
| 0.125 | 2.516 | 3.188 |
| 0.250 | 1.875 | 2.516 |
| 0.375 | 1.313 | 1.825 |
| 0.800 | 0.875 | 1.313 |
| 0.625 | 0.547 | 0.875 |
| 0.760 | 0.313 | 0.547 |
| 0.875 | 0.156 | 0.313 |
| 1.000 | 0.063 | 0.156 |
| 0.875 | 0.023 | 0.063 |
| 0.750 | 0.031 | 0.016 |
| 0.625 | 0.086 | 0.016 |
| 0.500 | 0.188 | 0.063 |
| 0.375 | 0.352 | 0.156 |
| 0.250 | 0.594 | 0.313 |
| 0.125 | 0.930 | 0.547 |
| 0.000 | 1.375 | 0.875 |
| 0.000 | 1.930 | 1.313 |
| 0.000 | 2.531 | 1.875 |
| 0.000 | 3.133 | 2.516 |
| 0.000 | 3.688 | 3.188 |
| 0.000 | 4.148 | 3.844 |
| 0.000 | 4.469 | 4.438 |

If the correlation is calculated again, using the interpolated values from Table 3, we obtain the values in Table 4:

TABLE 4

| Distance (in pixels) | Correlation green-red | Correlation green-blue |
| --- | --- | --- |
| 0.000 | 5.260 | 4.922 |
| 0.500 | 5.375 | 5.250 |
| 1.000 | 5.250 | 5.375 |
| 1.500 | 4.922 | 5.250 |
| 2.000 | 4.438 | 4.922 |
| 2.500 | 3.844 | 4.438 |
| 3.000 | 3.188 | 3.844 |
| 3.500 | 2.516 | 3.188 |
| 4.000 | 1.875 | 2.516 |
| 4.500 | 1.313 | 1.875 |
| 5.000 | 0.876 | 1.313 |
| 5.500 | 0.547 | 0.875 |
| 6.000 | 0.313 | 0.547 |
| 6.500 | 0.156 | 0.313 |
| 7.000 | 0.063 | 0.156 |
| 7.500 | 0.023 | 0.063 |
| 8.000 | 0.031 | 0.016 |
| 8.500 | 0.086 | 0.016 |
| 9.000 | 0.188 | 0.063 |
| 9.500 | 0.352 | 0.156 |
| 10.000 | 0.594 | 0.313 |
| 10.500 | 0.930 | 0.547 |
| 11.000 | 1.375 | 0.875 |
| 11.500 | 1.930 | 1.313 |
| 12.000 | 2.531 | 1.875 |
| 12.500 | 3.133 | 2.516 |
| 13.000 | 3.688 | 3.188 |
| 13.500 | 4.148 | 3.844 |
| 14.000 | 4.469 | 4.438 |

As can be concluded from Table 4, these values provide a much more accurate picture of the distance of the coloured lines (13,15) from the reference line: the red line (13) lies 0.5 pixel unit from the green line (12), the blue line (15) is shifted precisely 1 pixel unit with respect to the green line (12). This method provides so-called sub-pixel resolution.

When the output from the camera (6) is digitized using an 8-bit analog-to-digital converter, 256 different voltage levels can be distinguished. For digitized waveforms shown at full scale, we obtain a maximum horizontal resolution equivalent to $N_x$ multiplied by the number of interpolations. Theoretically, a horizontal resolution of $N_x*256$ can be obtained. For a camera (6) with $N_x=512$, interpolation increases the resolution from 512 pixels to 131072 synthetic pixels in this way.

There are various methods for data interpolation in the time domain: linear interpolation, parabolic, spline interpolation, Bezier and many others. The choice of which method to use depends on what is required. Linear interpolation is quick, but does not give a smooth curve. Bezier and spline interpolation do give a smooth curve but are very time-consuming. Even SINC waveform convolution may be used, since it is the inverse Fourier transform of an ideal low-pass filter and thus ought to provide best results without introducing parasitic signals.

Figure 9:
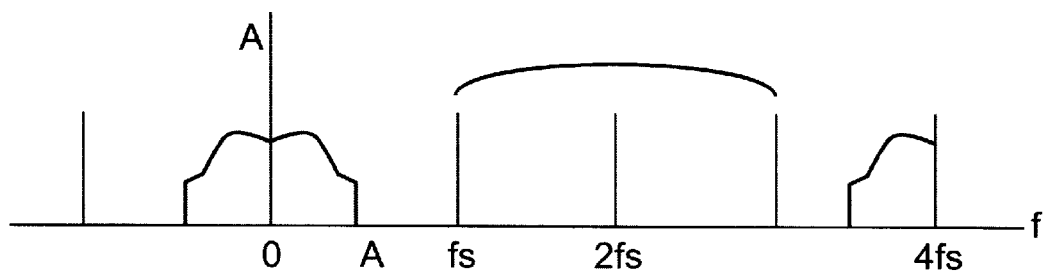
FIG. 9 illustrates the interpolation theorem.

An ideal interpolation in the time domain can be viewed as the introduction of zero values into the frequency domain. FIG. 9 shows this clearly. Here the amplitude spectrum of the filtered data is again plotted as a function of the frequency. fs is the Shannon-Nyquist frequency.

Assume that the original row of data has a length of N (=a point that corresponds to $f_s$). The aforementioned ideal filter already sets each frequency component above A (see FIGS. 6 and 9) to zero. If zero values are now added after $f_s$, no effective frequency components are added and yet the length of the original row increases. This means that the original signal has not changed, for its spectrum remains the same.

Consequently, an ideally interpolated counterpart emerges if the inverse Fourier transform is calculated using this extended sequence. This is indeed the ideal since no frequency components are added, which is not the case with other interpolation methods in the time domain.

We therefore obtain zeros between A and fs through filtering in FIG. 9, and zeros after fs, more specifically between fs and 3 fs, through interpolation. After 3 fs we again have zeros owing to filtering and so on.

There are still other known methods to attain 'sub-pixel' resolution, for example via cross-point characteristics or edge detection.

Exponential Smoothing

Figure 10:
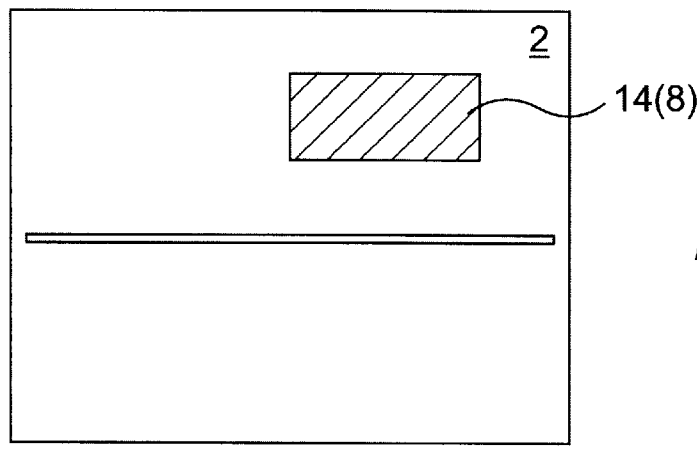
FIG. 10 represents the 'line' phenomenon.

As the measurements from the CCD camera (6) are executed from the vertical phase with the projected source, one must take into account the phenomenon of 'vertical lines'. The CCD camera (6) takes its pictures at a field frequency of, for example, 50 Hz, but this frequency has no relationship with the frequency of the projected source. Consequently, it is possible that the window 14(8) may lie at a specific instant in the 'black', non-scanned part (see FIG. 10). In this diagram, we see a screen (2), a window 14(8) and the line (16) scanned at this moment.

A simple solution, however, is to make multiple measurements in the same area. These measurements are then converted to a single measurement. This measurement averaging is a possible solution, but any false measurement would confuse the whole series of measurements. Its presence is never eliminated.

Figure 11:
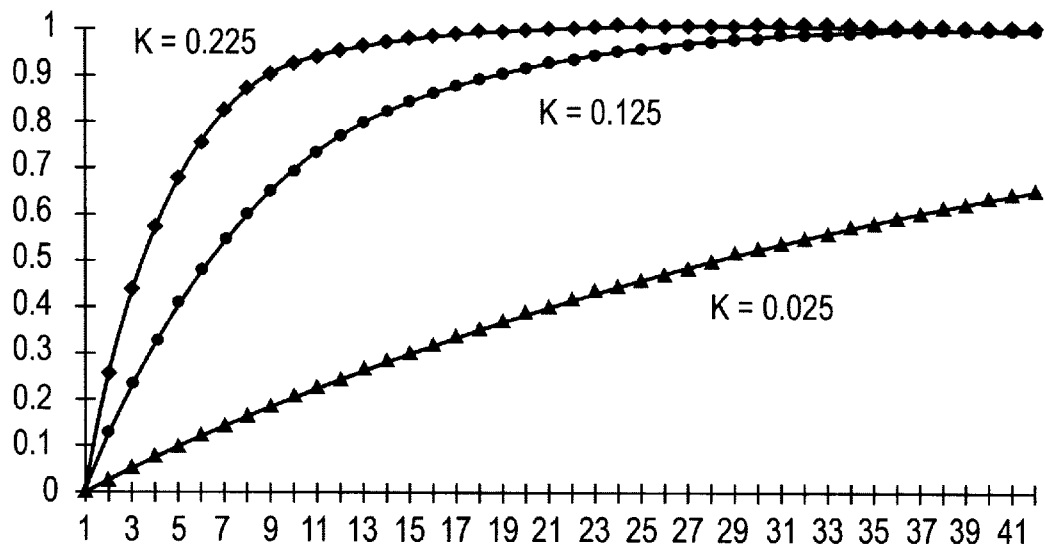
FIG. 11 is a demonstration of the different values of K used in the formula for exponential smoothing.

An alternative approach gives better results in a very noisy environment: exponential smoothing (a moving averaging instead of a block averaging). This is an iterative algorithm involving the following computation:

$$Y_{n+1}=Y_n-K(Y_n-Input)$$

Where $Y_{n+1}$ is an estimate of the last value, $Y_n$ is an estimate of the last sample, the variable Input is the present input sample and K is a constant smaller than 1. The reason why this is called exponential smoothing while no exponential function is found in the equation can be explained simply by considering the step response. We will assume that the original input was zero, that also then being the value of $Y_n$, and that the input suddenly becomes one and remains at that level. The output of the algorithm for different values of K is shown in FIG. 11.

The curves are actual exponentials whose time constants are directly controlled through the value of K. When K=0, the new measurements are not taken into account and only the old estimations remain (in a manner of speaking an infinite filter effect). When K=1, on the other hand, there is no need for filtering: the new estimate is then always directly equated to the new measurements.

The chief advantage of this method is its immunity to incorrect measurements (for example the source of lines). These measurements are smoothed instead of an averaging being carried out on each measurement.

When the signal-to-noise ratio is very low, exponential smoothing is used with a variable gain factor 'A' provided by the following formula:

$$y_0=x_0$$

$$y_n=A[(1-K)y_{n-1}+Kx_n]$$

The convergence condition is as follows:

$$[A(1-K)]<1; K<1$$

In this case, the calculated digitized values are always multiplied by the gain factor A. This is possible since these values have already been in the filter and therefore there is a smaller chance that the noise will be amplified, since the latter is eliminated through the effect of the filter. The level of useful information thus rises, or in other words: the signal-to-noise ratio is enhanced in a mathematical way.

Even if the convergence adjustment is not carried out effectively, the aforementioned measurement can provide useful information to the user: for example, a scale marker can be projected onto the screen (2) to see clearly how well the convergence of a zone or of the complete picture has been adjusted. Instead of a scale marker, the accompanying control unit can act as a gate in order to send this information, for example via an RS232 channel, to a PC, where it can be read out.

2. Automatic Geometry Adjustment of a Projector

The adjustment of the geometry of a picture built up on the screen (2) via a projector (1) occurs in a similar way to convergence adjustment in each adjustment zone 14(i).

The user gives an instruction to the projector (1) to carry out the geometry adjustment. The control unit of the projector (1) will set the universal device (connected to the projector (1)) into a mode suitable for carrying out geometry adjustment. In reality, this means that the universal device is set to 'window digitization mode', i.e. ready, on a command signal from the control unit of the projector (1), to read and digitize the picture that the camera (6) views on the screen (2), and to store only the digitized values from the window 14(8) indicated by the control unit in memory.

For geometry adjustment, however, as opposed to convergence adjustment, reference values for the geometry are stored, which values indicate, for example, the left- and right-hand top and bottom corners, as well as the centre of the picture. The picture on which adjustment is to be made is therefore not another picture projected onto the screen (2) but consists of a number of reference values stored in the memory, input by a user or indicated via a laser pointer (see also point 10.) The reference can also be a fixed frame arranged onto the screen (2). Correlation is used to adjust the picture to these reference values, preferably using the 'linked' zones principle.

Even if the geometry adjustment is not carried out effectively, the aforementioned measurement can provide useful information to the user: for example, a scale marker can be projected onto the screen (2) to see clearly how well the geometry of a zone or of the complet picture has been adjusted. Instead of a scale marker, the accompanying control unit can act as a gate in order to send this information, for example via an RS232 channel, to a PC, where it can be read out.

3. Automatic Focus Adjustment of a Projector Picture

When a user gives an instruction to automatically carry out the focus adjustment, the projector (1) control unit again sets the universal device to window digitization mode.

To adjust the focus, the adjustment zones 14(i) are again determined, in the same way as described above. The correspondence between the location of these zones 14(i) on the screen (2) and the camera (6) pixels is measured, or the corresponding values are read in from a memory.

The camera (6) views the picture projected onto the screen (2) and forms an analog signal, which is fed to the universal device. This analog signal is converted into digitized values via analog-to-digital conversion.

The focus of the picture is adjusted for the various linked zones 14(i) by constructing a mathematical model based on variance calculations in the form of a histogram or spectrum evaluation.

Histograms are frequently used for measurements. The digital contrast of a picture is derived using the distribution of the grey-scale values. When this distribution is concentrated around a certain level, then the contrast is clearly low. The contrast of a picture as a whole can be read from this histogram.

The average intensity of a picture is determined from the following formula:

$$E(X) = \frac{1}{N}\sum_{n=1}^{N} X(n)$$

where N is the number of different grey-scale values occurring, X(n) is the number of pixels in the measured picture with intensity n.

The variance is calculated on the basis of the following formula:

$$V(x) = E(X^2) - (E(X))^2$$

The definition of contrast is taken as the square root of the variance.

The number obtained is a measure of the optimum focus value of the picture, for this gives a measure of the difference in grey-scale values between a pixel X and the average grey-scale value.

A measure of the picture sharpness can be obtained not only from the grey-scale value histogram calculations, but also from spectrum evaluation.

Figure 12:
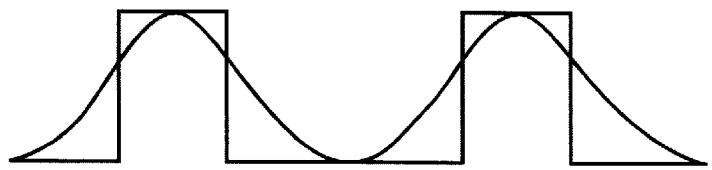
FIG. 12 depicts a bar test pattern, as well as the image thereof which is obtained by projection.

Let us suppose that one would like to measure the sharpness of a projected bar test pattern (see FIG. 12). The square wave in the diagram is a representation of the ideal test pattern, the sinusoidal curve a representation of the measured test pattern.

Figure 13:
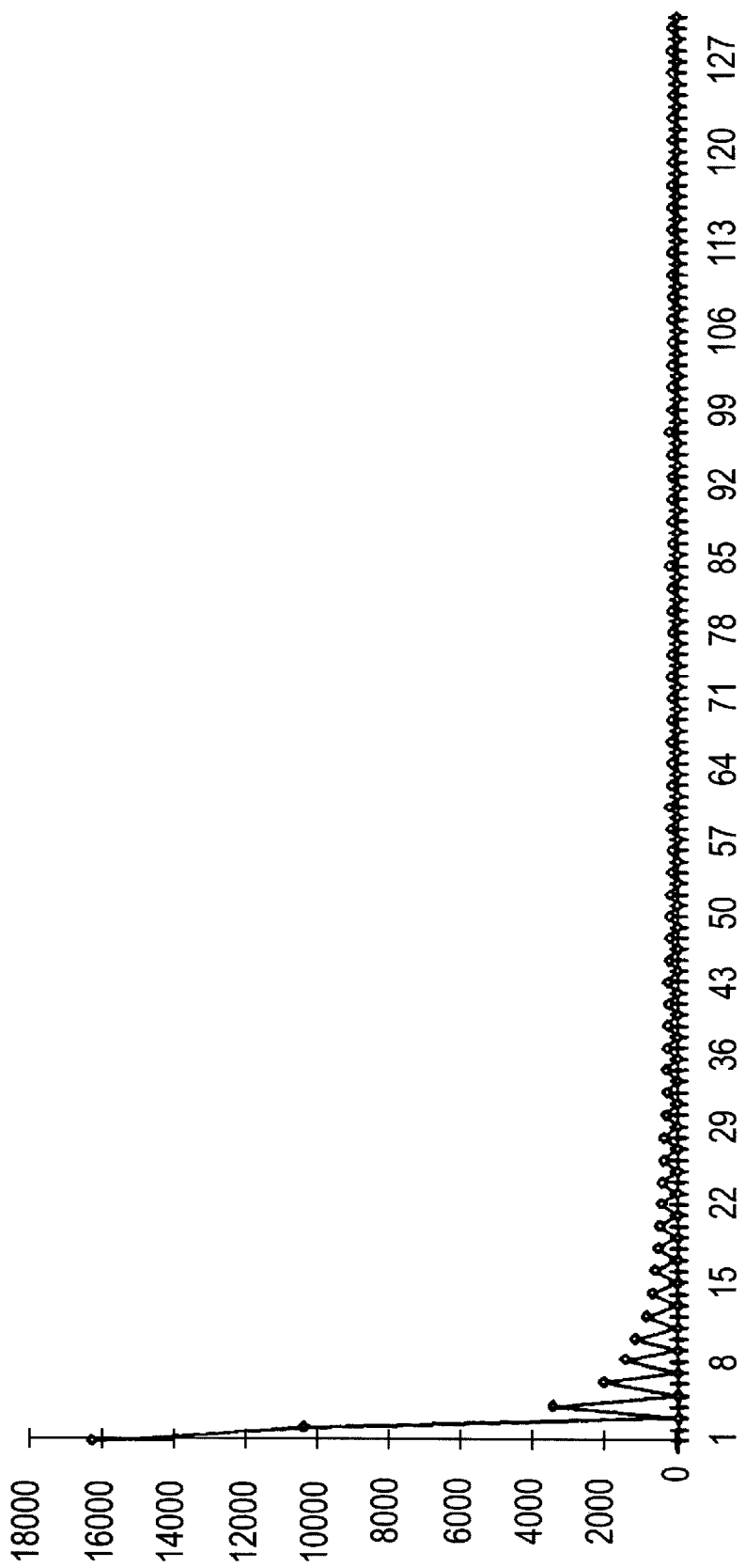
FIG. 13 is a graphical representation of the Fourier transform of the bar test pattern.
Figure 14:
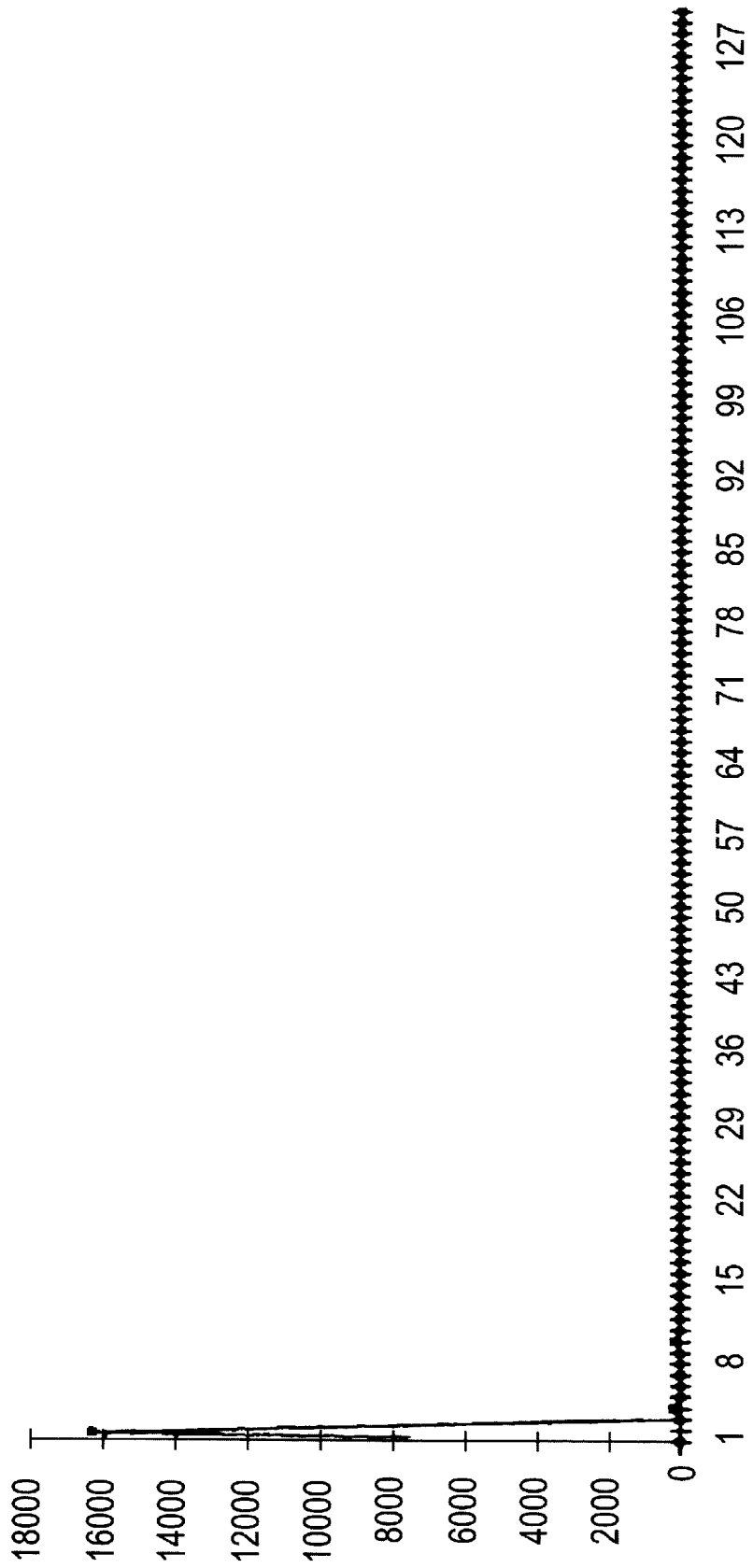
FIG. 14 is the graphical representation of the Fourier transform of the projection of the bar test pattern.

The Fourier transform of the square wave is as shown in FIG. 13, while the Fourier transform of the sinusoidal curve is as shown in FIG. 14.

It may be deduced from this that the sharper the projected picture, the more high-frequency components there are in the spectrum. A possible measure for the sharpness can, for example, be the number of high-frequency components, depending on what level of sharpness is desired by the user.

Another possibility is, for example, to determine the variance in the spectral components. When the signal is fuzzy, the variance in the spectral components is minimal, since only one frequency component is present. When a sharp test pattern is measured, the higher-frequency components will ensure a high variance. Thus, the variance or standard deviation of the spectral components (=spectral contrast) can also be regarded as a measure of the sharpness.

However the calculations are carried out, we find from them the relative values for the optimum focus value of the adjustment zones.

These values are entered into the model. Should there still be a residual error, then the model is improved by iteration.

Signals which are sent to the hardware responsible for focus adjustment concerning the adjustment zones 14(i) are derived from the relative values ultimately obtained for the optimum focus value in each of the adjustment zones 14(i).

The relationship between the sharpness and the focus (electrical adjustment) is obvious. However, these measurements can also help manual (or optionally controlled) adjustments, such as for example focussing the lenses which guide the picture from the projection means (picture tube or LCD) onto the screen (2). Even if the lens rotation cannot be controlled, this measurement can yield valuable information to the user: for example, a scale marker can be projected onto the screen (2) to see how sharp the picture in a zone or how sharp the complete image is. It should be adjusted until a maximum is attained. Instead of a scale marker, the accompanying control unit can be used as a gate to send this information via, for example, an RS232 channel to a PC where it can be read out.

4. Automatic Adjustment of Picture Astigmatism in a Projector

There is a relationship between astigmatism and focus: the 'rounder' the pixels can be made, the sharper the picture becomes.

The astigmatism in the centre of the picture is adjusted via mechanical shift rings around the picture tube. For the time being, this adjustment cannot yet be done automatically, but the measurements can give the user who is adjusting the device an indication of how well the adjustment has been done, until the measurements 'state' that the optimum focus value has been attained by this manual adjustment.

The universal device is again set to 'window digitization mode' for this method.

The adjustment zones 14(i) are determined and the corresponding coordinates on the camera (6) are fetched.

Camera (6) views the picture, which is sent to the universal device and forms an analog signal that is converted into digitized values in the analog-to-digital converter.

These digitized values are used to construct a mathematical model from which the relative astigmatism values are determined through a calculation of the variance plotted on a histogram, spectrum evaluation or moment evaluation.

The first two methods are as described with regard to automatic focus adjustment.

The third method, moment evaluation, is described below. A picture $b(x,y)$ can be regarded as a two-dimensional probability density function of the variable $(x,y)$. Assume that the quantity $b_{00} = \int\int b(x,y) \, dx \, dy = 1$. This actually amounts to re-scaling the grey-scale values of the picture. (If this is not the case, $$\left(\frac{b(x,y)}{b_{00}}1\right)$$

is considered.

The most important parameters under consideration are the picture moments. These are based on the following formula:

$$b_k = \int\int x^k y^l b(x,y) dx dy$$

The value of k+1 gives the so-called order of the moments in question.

For this, we derive the zero order moment:

$$b_{00} = \int\int b(x,y) dx dy$$

First order moments are:

$$b_{10} = \int\int x b(x,y) dx dy$$

$$b_{01} = \int\int y b(x,y) dx dy$$

Second order moments are 4

$$b_{20} = \int\int x^2 b(x,y) dx dy$$

$$b_{02} = \int\int y^2 b(x,y) dx dy$$

$$b_{11} = \int\int xy b(x,y) dx dy$$

The central point, that is to say the 'centre of the picture', lies at coordinates $(b_{10}, b_{01})$. Let us then consider a shift corresponding to $(x-b_{10}, y-b_{01})$. This amounts to the probability density distribution of the picture being centred around the central point. It is in fact reliably centred because this translation makes the first order moments zero, in other words the central point comes to lie at the origin.

The moment $b_{20}$ characterizes stretching in the x direction, while $b_{02}$ gives the same but in the y direction.

At face value these moments have little relevance. However, if we carry out a rotation through an angle θ, the coordinates of a point (x,y) rotate to the coordinates (x',y') in accordance with the well-known formulae for rotation:

$$x' = x \cos θ + y \sin θ$$

$$y' = -x \sin θ + y \cos θ^6$$

If we select the angle θ using the formula $$\tan 2θ = \frac{2b_{11}}{b_{20} - b_{02}}$$

where $$θ \in \left(0, \frac{π}{2}\right)$$

if $b_{11} > 0$, and $$θ \in \left(\frac{π}{2}, π\right)$$

if $7b_{11} < 0$, 8we obtain the following results in the new coordinate system:

$b'_{20} = \max$
$b'_{11} = 0$
$b'_{02} = \min$

And so we obtain two second order moments, corrected according to position and orientation. They are called invariant moments. When, for example, an ellipse is described, these moments are proportional to the length squared of the major axes.

In this way, it is possible to describe the area of a picture point (pixel), the ellipticity and amount of rotation and measure them in terms of digital values. This latter allows astigmatism to be adjusted.

Even when it is not possible to automatically adjust the astigmatism, measurements derived from astigmatism using the aforementioned method can provide valuable information to the user: for example, a scale marker may be projected onto the screen (2) giving an indication of the pixel quality in specific areas. Instead of a scale marker, the accompanying control unit can act as a gate to send this information via, for example, an RS232 channel to a PC, where it may be read out.

The aforementioned adjustment can only be applied to CRT projectors.

5. Automatic Contrast-modulation Adjustment

The universal device is again put into the 'window digitization mode'.

For this purpose, calibration values for the camera (6), relating to the intensity, for the colour or colours to be controlled are fetched from the memory or measured, after which these values can be entered into the mathematical model.

The zones 14(i) are determined as described above.

Intensity measurements are made giving a measure for the relative intensity for a well-defined or known control relating to the colour or colours to be adjusted.

A model is constructed. Optimum values are determined by intensity measurements. These are entered into the model. Should a residual error still remain, then the model is improved using an iterative process.

From the measure which is ultimately obtained for the relative intensity, signals are derived which are sent to the hardware responsible for contrast-modulation control relating to the adjustment zones.

Even if the contrast-modulation control is not effectively executed, the abovementioned measurement can provide valuable information to the user: for example, a scale marker can be projected onto the screen (2) or the accompanying control unit can act as a gate in order to send this information via, for example, an RS232 channel to a PC where it then can be read out.

6. Automatic Control of Gamma Correction

The automatic adjustment of the gamma correction takes place in a similar way to the automatic adjustment of the contrast modulation. Preferably, only one control is carried out per colour and is responsible for the whole picture.

Likewise, a measure for the relative intensity is determined and from this signals are derived which are sent to the hardware responsible for gamma-correction control.

Even if the contrast-modulation control is not effectively executed, the abovementioned measurement can provide valuable information to the user: for example, a scale marker can be projected onto the screen (2) or the accompanying control unit can act as a gate in order to send this information via, for example, an RS232 channel to a PC where it then can be read out.

7. Automatic Control of Soft Edge for Pictures Located Next to One Another of Two or More Projectors Soft edge has to be adjusted whenever two or more projectors project onto the screen pictures which contact one another. In the boundary area, the pictures will overlap a little and therefore we obtain double the intensity. It is precisely in that area that each of the pictures must be subjected to an intensity drop so that when the pictures overlap the sum of the intensities is the same as the intensity in the rest of the picture.

The automatic adjustment occurs in the same way as the contrast-modulation adjustment, except that it is carried out at the edge of the picture.

The wire-free transmission of information described in point 13 can be used in the adjustment of soft edge.

Even if soft-edge control is not effectively carried out, the abovementioned measurement can provide valuable information to the user: for example, a scale marker can be projected onto the screen (2) or the accompanying control unit can act as a gate in order to send this information via, for example, an RS232 channel to a PC, where it then can be read out.

8. Automatic Control of Adjacent and/or Overlapping Geometry for Pictures Located Next to one Another of Two Projectors In this process, the geometry of two pictures located next to one another of two projectors (1) is adjusted. This occurs in the same way as for geometry adjustment (or convergence), except that two projectors are involved.

For all the aforementioned methods, one or more of the operations described for automatic convergence control, namely exponential smoothing, transformation, filtering and/or interpolation, can be applied to the digitized values.

Wire-free transmission of information described in point 13 can be used in the adjustment of adjacent and/or overlapping geometry.

Even if the control of adjacent and/or overlapping geometry is not effectively carried out, the abovementioned measurement can provide valuable information to the user: for example, a scale marker can be projected onto the screen (2) or the accompanying control unit can act as a gate in order to send this information via, for example, an RS232 channel to a PC, where it can be read out.

9. Use as a Video Digitizer

In this case, the universal device is put into a mode such that it is able to digitize continuously. A control unit transfers these data via any form of communication means (for example via RS232) to a PC, where these digital data are processed.

10. Implementation as a Peak Detector

The universal device is put into 'peak detection mode' for implementation as a peak detector. For this, a camera (6) views the picture projected onto the screen (2) and the analog signal which is thus obtained is constantly digitized without values being stored in the RAM. Points with a high light intensity are continuously being sought.

The peak detector can be used for example to indicate references for geometry adjustment using for example a laser pointer. These are measured by the peak detector and the corresponding relative reference coordinates are sent to the control unit.

The peak detector may likewise be used for the implementation of a mouse tracker for a laser pointer. For this, the same procedure is adopted. If a point with high intensity is detected, the accompanying control unit is informed of this and the corresponding XY coordinates of the tops of the peaks are sent, for example, to a PC in order to make the mouse pointer track. Instead of allowing the PC to make the mouse pointer track, it is also possible to command the projector (1) itself to project a character onto the location having those coordinates.

It is possible that the memory is not used in this application.

11. Use as RAM Expansion—Co-processor for the Control Unit

The universal device is put into a mode so as to operate as a memory expansion or specific auxiliary control unit for the existing control unit. In this configuration the analog-to-digital converter is not used.

For example, the correlation calculations of the aforementioned methods can be carried out by the device, as a result of which the control unit gains additional time to execute other operations. In this way one gains adjustment speed.

12. Use for Signal Testing and Analysis

The universal device is put into a mode so that, for example, it can be used for testing. Different test modes are possible according to the tests to be carried out.

In self-test mode, the memory is tested for data loss and the short-circuiting of data or of address lines. Also the analog-to-digital converter and all other integrated circuits may be tested in this way.

The device itself must be in good condition before reliable measurements and calculations can be made.

Part of the operation of the accompanying control unit of the projector (1) can also be tested via the universal device provided it is set in the appropriate mode.

If necessary an error signal is returned in these tests.

Another possibility is that the universal device is put into a mode so that it is suitable for signal analysis. If an analog signal is applied to the pin of the device, the latter can analyse and check this signal for specific characteristics.

13. Use for Wire-free Transmission of Information Between Two or More Projectors Two projectors (1) which are in each other's field of view with regard to the camera (6) can communicate with each other via light codes instead of via physical means such as cables. These light codes can be a kind of bar code, which are projected by one projector (1) onto the screen (2) after which they are detected by the other. Each bar code or sequence of bar codes contains an instruction. The detecting projector (1) carries out this instruction and can also in turn project light codes onto the screen (2), which can be scanned by the other projector (1) and the corresponding instruction can be carried out.

Line detection is the measurement principle used to find the location of the bar codes.

Figure 15:
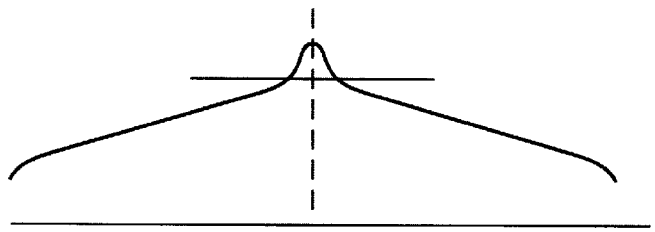
FIG. 15 represents the method for line detection.

The object of this principle is to find a limit value (see FIG. 15). If digitized values occur which are greater than this limit value, then this indicates that a line is present.

Figure 16:
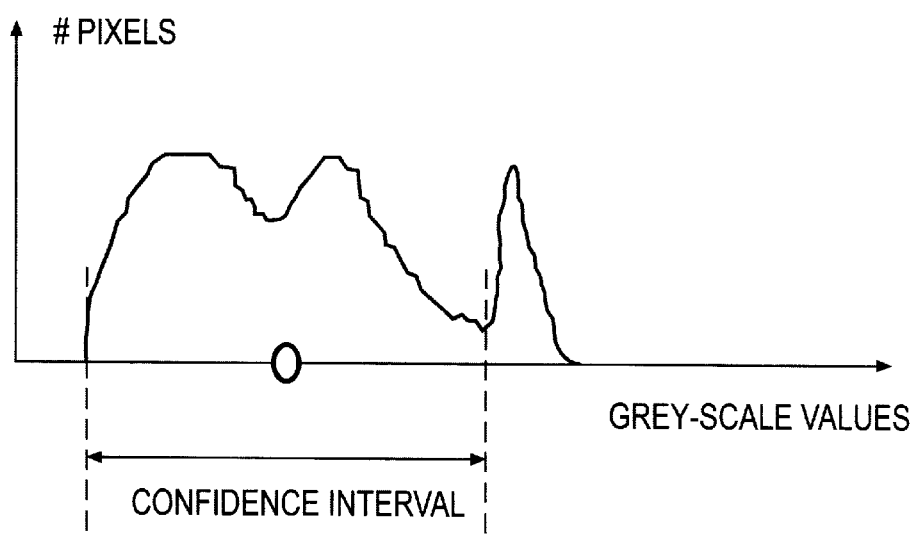
FIG. 16 is the representation of a normalized grey-scale value-based histogram.

The method consists in drawing up the normalized grey-scale value histogram (see FIG. 16) for the digitized values. Normalized is understood to mean that the grey-scale values lie between 0 and 1. Then a confidence interval relating to the grey-scale values is selected containing for example 90% of the grey-scale values. The grey-scale value central point is calculated (indicated by 0 in FIG. 16) using the grey-scale values located within the confidence interval—this being a good value for the average background intensity. This value can be used to derive the limit value. Preferably, the limit value has a power between 0 and 1 of the previously calculated grey-scale value central point, for example the square root. Each normalized digitized value located above this limit value indicates the presence of a line. The width and the coordinates of the line can be derived from the original series of digitized values.

This method can also be applied in two dimensions.

The light codes may also be sequential intensity variations, as a result of which the use of a test picture generator is rendered superfluous.

The measurement principle applied in intensity variations is relative intensity measurements.

Inter alia, the transmission of information between a plurality of projectors (1) can be used for the adjustment of overlapping or adjacent geometry, for the adjustment of soft edge or for simple data transfer. The transmission of information is always necessary if it is necessary to control the other projector (1) in order to obtain the adjustment correctly.

14. Use as a Signal Decoder

The universal device is put into a mode so as to operate as a teletext decoder. In this configuration, the analog-to-digital converter is used to convert the analog video signal which contains teletext information into digitized values via analog-to-digital conversion. From these digitized values, the accompanying control unit or the universal device itself can extract the teletext information.

Other analog applications are for example: RS232 decoding, or if the signal which is applied to the pin originates from an IR receiver, the universal device can be set in a mode such that it is able to decode different IR codes, for example codes output by a remote control.

What is claimed is:

1. A universal device for being used as support for carrying out methods for adjustment of projectors as well as support for non-adjustment tasks, the adjustment and non-adjustment tasks being imposed on said universal device by a control unit which forms part of a projector, the universal device exhibiting different operational characteristics in accordance with different applications imposed on said universal device by the control unit, said universal device comprising:
  an analog-to-digital converter,
  a memory,
  a programmable digital component, and
  an interface to the control unit of a projector;
  wherein a task is imposed on said universal device.

2. The universal device according to claim 1, wherein the task is imposed by an external control unit via the control unit of the projector.

3. The universal device according to claim 1, wherein the analog-to-digital converter is an 8-bit converter.

4. The universal device according to claim 1, further comprising a plug provided with a pin, wherein an analog signal is applied via the plug to the analog-to-digital converter.

5. The universal device according to claim 4, wherein there are no means to ensure hardware synchronisation with the analog signal applied to the pin.

6. A projection system comprising the following elements:
  a screen,
  a projector provided with at least one picture-forming means that generates a picture, at least one projection means in order to project that picture onto the screen and a control unit,
  a camera linked to the projector configured to view the pictures projected onto the screen and
  a universal device, including an analog-to-digital converter, a memory, a programmable digital component, an interface to the control unit of the projector, and a plug provided with a pin,
  wherein the picture that the camera views forming an analog signal that is applied to the pin of the universal device, and in that the control unit of the projector is able to put said universal device in a set mode after which it is able to execute tasks sent by the control unit and on the command from the control unit.

7. The projection system according to claim 6, wherein the camera, which is linked to the projector, is a low-resolution camera.

8. The projection system according to claim 6, wherein the camera, which is linked to the projector, is connected immovably to the projector.

9. A method for the automatic adjustment of the convergence of at least two pictures, each of which has covered a different light path and which are built up on a screen using a projector which is provided with a control unit, hardware responsible for convergence control and a universal device including an analog-to-digital converter, a memory, a programmable digital component, an interface to the control unit of the projector, and a plug provided with a pin, a camera linked to the projector viewing the screen, the method comprising:
  controlling the projector by establishing a 'window digitization mode' in the universal device,
  projecting the pictures onto the screen split into one or more adjustment zones which need not be predetermined,
  fetching the coordinates of the adjustment zone, as viewed by the camera on the screen,
  viewing the pictures using the camera on a command signal from the control unit of the projector, forming an analog signal, and converting the analog signal into digitized values via analog-to-digital converter of the universal device,
  constructing a mathematical model using the digitized values,
  determining the relative distance between the pictures to be adjusted relative to one another in the adjustment zone by correlation of the digitized values, and deriving from the relative distance adjustment signals, which signals are sent to the hardware responsible for the convergence control in the adjustment zone.

10. A method for the automatic adjustment of the geometry of a picture which is built up on a screen using a projector which is provided with a control unit, hardware responsible for geometry control and a universal device including an analog-to-digital converter, a memory, a programmable digital component, an interface to the control unit of the projector, and a plug provided with a pin, a camera linked to the projector viewing the screen, the method comprising:
  controlling the projector by establishing a 'window digitization mode' in the universal device,
  splitting the pictures projected onto the screen into one or more adjustment zones which need not be predetermined,
  fetching reference values for the geometry,
  viewing the picture using the camera, forming an analog signal, converting the analog signal into digitized values via analog-to-digital converter of the universal device,
  constructing a mathematical model using the digitized values,
  determining the relative distance between the reference values and the picture, which is to be adjusted to the reference values, in the adjustment zone by correlation of the digitized values, and deriving from the relative distance adjustment signals which are sent to the hardware responsible for the geometry control in the adjustment zone.

11. A method for the automatic adjustment of adjacent and overlapping geometry of pictures which are built up on a screen using at least two projectors which are each provided with a control unit, hardware responsible for the control of adjacent and overlapping geometry and a universal device including an analog-to-digital converter, a memory, a programmable digital component, an interface to the control unit of the projector, and a plug provided with a pin, one or more cameras being linked to the projectors for viewing the screen, the method comprising:
  controlling the projector by establishing a 'window digitization mode' in the universal device,
  splitting the pictures projected onto the screen into one or more adjustment zones which need not be predetermined,
  fetching the coordinates of the adjustment zone, as viewed by the camera on the screen,
  viewing the pictures using at least one camera and forming an analog signal which is converted into digitized values via analog-to-digital converter of the universal device,
  constructing a mathematical model using these digitized values,
  determining the relative distance between the pictures to be adjusted in the adjustment zone by correlation of the digitized values, and deriving from this relative distance adjustment signals, further signals which are sent to the hardware responsible for the control of adjacent and overlapping geometry in the adjustment zone.

12. A method for the automatic adjustment of the focus of a picture which is built up on a screen using a projector which is provided with a control unit, hardware responsible for focus control and a universal device including an analog-to-digital converter, a memory, a programmable digital component, an interface to the control unit of the projector, and a plug provided with a pin, a camera linked to the projector viewing the screen, the method comprising:

controlling the projector by establishing a 'window digitization mode' in the universal device, splitting the picture projected onto the screen into one or more adjustment zones which need not be predetermined, fetching the coordinates of the adjustment zone, as viewed by the camera on the screen, viewing the picture by using the camera and forming an analog signal which is converted into digitized values via analog-to-digital converter of the universal device, constructing a mathematical model using the digitized values, determining a relative value for the optimum focus value of the adjustment zone, and deriving signals from this relative value which are sent to the hardware responsible for the focus control concerning the adjustment zone.

13. The method according to claim 12, wherein the relative value for the optimum focus value is determined by calculating the variance on the basis of histograms or using the power spectrum density function.

14. A method for the automatic adjustment of the astigmatism of a picture which is built up on a screen using a projector which is provided with a control unit, hardware responsible for astigmatism control and a universal device including an analog-to-digital converter, a memory, a programmable digital component, an interface to the control unit of the projector, and a plug provided with a pin, a camera linked to the projector viewing the screen, the method comprising:

controlling the projector by establishing a 'window digitization mode' in the universal device, splitting the picture projected onto the screen into one or more adjustment zones which need not be predetermined, fetching the coordinates of the adjustment zone, as viewed by the camera on the screen, viewing the picture using the camera and forming an analog signal which is converted into digitized values via analog-to-digital converter of the universal device, constructing a mathematical model using the digitized values, determining the relative measures for the astigmatism from the digitized values, and deriving signals from the relative measures for the astigmatism which are sent to the hardware responsible for astigmatism concerning the adjustment zone.

15. The method according to claim 14, wherein the relative measures for the astigmatism are determined by calculating the variance on the basis of histograms, calculating the variance on the basis of spectrum evaluation, or calculating the variance on the basis of moment evaluation.

16. A method for the automatic adjustment of the contrast modulation of a picture which is built up on a screen using a projector which is provided with a control unit, hardware responsible for contrast modulation control, and a universal device including an analog-to-digital converter, a memory, a programmable digital component, an interface to the control unit of the projector, and a plug provided with a pin, a camera linked to the projector viewing the screen, the method comprising:

controlling the projector by establishing a 'window digitization mode' in the universal device, fetching calibration values for the colour of the picture for the camera, splitting the picture projected onto the screen into one or more adjustment zones which need not be predetermined, fetching the coordinates of the adjustment zone, as viewed by the camera on the screen, viewing the picture using the camera and forming an analog signal which is converted into digitized values via analog-to-digital converter of the universal device, constructing a mathematical model using the digitized values, determining a measure for the relative intensity, and deriving from this measure for the relative intensity signals which are sent to the hardware responsible for the contrast modulation concerning the adjustment zone.

17. A method for the automatic adjustment of gamma correction of a picture which is built up on a screen using a projector which is provided with a control unit, hardware responsible for contrast modulation control and a universal device including an analog-to-digital converter, a memory, a programmable digital component, an interface to the control unit of the projector, and a plug provided with a pin, a camera linked to the projector viewing the screen, the method comprising:

controlling the projector by establishing a 'window digitization mode' in the universal device, fetching calibration values for the colour of the picture for the camera, splitting the picture projected onto the screen into one or more adjustment zones which need not be predetermined, fetching the coordinates of the adjustment zone, as viewed by the camera on the screen, viewing the picture using the camera and forming an analog signal which is converted into digitized values via analog-to-digital converter of the universal device, constructing a mathematical model using the digitized values, determining a measure for the relative intensity, and deriving from this measure for the relative intensity signals which are sent to the hardware responsible for the gamma correction concerning the adjustment zones.

18. A method for the automatic adjustment of soft edge of the pictures which are built up on one or more screens using at least two projectors, each provided with a control unit, hardware responsible for soft edge control, and a universal device including an analog-to-digital converter, a memory, a programmable digital component, an interface to a control unit of a projector, and a plug provided with a pin, one or more cameras linked to the projectors viewing the screen, the method comprising:

controlling the projector by establishing a 'window digitization mode' in the universal device, fetching calibration values for the colour of the said projected pictures for the one or more cameras, splitting the picture projected onto the screens into one or more adjustment zones which need not be predetermined, fetching the coordinates of the adjustment zones, as viewed by the cameras on the screens, viewing the projected pictures using the camera and forming an analog signal which is converted into digitized values via analog-to-digital converter of the universal device, constructing a mathematical model using the digitized values, determining a measure for the relative intensity, and deriving from this measure for the relative intensity signals which are sent to the hardware responsible for the soft edge adjustment concerning the adjustment zones.

19. The method according to any of claims 9 to 18, wherein the digitized values are added or altered for introducing updated digitized values.

20. The method according to any of claims 9 to 18, performing a transformation on the digitized values and therefore forming updated digitized values.

21. The method according to claim 20, wherein the transformation is a Fourier transform.

22. The method according to any of claims 9 to 18, wherein the mathematical model, if there is more than one zone, reproduces the effect of the corresponding control in a specific adjustment zone on all the other zones linked to this adjustment zone.

23. The method according to any of claims 9 to 18, wherein the mathematical model reproduces the mutual effect of the different adjustments on each other.

24. The method according to any of claims 9 to 18, wherein the mathematical model reproduces the models of the camera or a camera lens.

25. The method according to any of claims 9 to 18, wherein the content of the picture or pictures is not important as long as the picture information for each picture to be adjusted substantially corresponds.

26. The method according to any of claims 9 to 18, further including improving the mathematical model through an iterative process.

27. The method according to any of claims 9 to 18, further including storing the mathematical model in the memory.

28. The method according to any of claims 9 to 18, further including reading the mathematical model from the memory.

29. A method for the wire-free transmission of information between two or more projectors provided with a universal device including an analog-to-digital converter, a memory, a programmable digital component, an interface to a control unit of a projector, and a plug provided with a pin, at least one of the projectors being provided with at least one camera, and the projectors being mounted in front of a screen, the method comprising:

projecting picture information via one projector onto the screen and viewing the picture information by the camera linked to the other projector, viewing the picture by the camera, forming an analog signal, and converting the analog signal into digitized values via analog-to-digital converter of the universal device, deriving command signals from these digitized values, interpreting the digitized values by the control unit of the projector in question, and executing these command signals by the control unit.

30. A method for the decoding of information present in a video signal by using a universal device including an analog-to-digital converter, a memory, a programmable digital component, an interface to a control unit of a projector, and a plug provided with a pin, the method comprising:

applying an analog video signal containing information to the pin of the universal device, converting the analog video signal into digitized values via analog-to-digital deriving command signals from the digitized values, and interpreting the command signals by the accompanying control unit.

31. The method according to claim 30, wherein the information is teletext information.

* * * * *